US012739783B2

(12) United States Patent
Yu et al.

(10) Patent No.: US 12,739,783 B2
(45) Date of Patent: Sep. 15, 2026

(54) POSITIONING METHOD AND APPARATUS

(71) Applicant: HUAWEI TECHNOLOGIES CO., LTD., Shenzhen (CN)

(72) Inventors: Yingjie Yu, Shanghai (CN); Yi Wang, Shanghai (CN); Guohua Zhou, Shanghai (CN); Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 18/543,228

(22) Filed: Dec. 18, 2023

(65) Prior Publication Data

US 2024/0129894 A1 Apr. 18, 2024

Related U.S. Application Data

(63) Continuation of application No. PCT/CN2022/098474, filed on Jun. 13, 2022.

(30) Foreign Application Priority Data

Jul. 2, 2021 (CN) ........................ 202110750946.X

(51) Int. Cl.
*H04W 64/00* (2009.01)
*H04B 7/145* (2006.01)
(Continued)

(52) U.S. Cl.
CPC .......... *H04W 64/006* (2013.01); *H04B 7/145* (2013.01); *H04W 16/28* (2013.01); *H04W 24/10* (2013.01)

(58) Field of Classification Search
None
See application file for complete search history.

(56) References Cited

U.S. PATENT DOCUMENTS

2020/0333427 A1* 10/2020 Hu ........................ H04W 24/10
2023/0300777 A1* 9/2023 Cha ........................ H04W 64/00 455/456.1
2024/0259150 A1* 8/2024 Cha ................... H04W 74/0833

FOREIGN PATENT DOCUMENTS

CN 103582116 A 2/2014
WO 2019154992 A1 8/2019
WO 2020096506 A1 5/2020

OTHER PUBLICATIONS

Extended European Search Report issued in corresponding European Application No. 22831680.8, dated Jan. 9, 2025, pp. 1-12.

(Continued)

*Primary Examiner* — Adolf Dsouza
(74) *Attorney, Agent, or Firm* — HAUPTMAN HAM, LLP

(57) ABSTRACT

A location management network element sends first indication information to a network device, where the first indication information is useable by the network device to measure a signal that is sent by a terminal device and that is reflected by a reflection panel. After receiving the first indication information, the network device measures the signal reflected by the reflection panel, and reports a measurement result to the location management network element. The location management network element determines a location of the terminal device based on location information of the network device, location information of the reflection panel, and the measurement result. In response to a line-of-sight (LOS) path between the terminal device and the network device being blocked, a signal on the LOS path cannot be directly transmitted and measured.

16 Claims, 6 Drawing Sheets

(51) Int. Cl.
*H04W 16/28* (2009.01)
*H04W 24/10* (2009.01)

(56) References Cited

OTHER PUBLICATIONS

3GPP TS 38.455 V16.1.0 (Sep. 2020):"3rd Generation Partnership Project; Technical Specification Group Radio Access Network;NG-RAN;NR Positioning Protocol A (NRPPa) (Release 16)",total 147 pages.

3GPP TS 38.305 V16.2.0 (Sep. 2020):"3rd Generation Partnership Project; Technical Specification Group Radio Access Network;NG Radio Access Network (NG-RAN); Stage 2 functional specification of User Equipment (UE) positioning in NG-RAN(Release 16)", total 117 pages.

3GPP TS 38.305 V15.0.0 (Jun. 2018):"3rd Generation Partnership Project; Technical Specification Group Radio Access Network;NG Radio Access Network (NG-RAN);Stage 2 functional specification of User Equipment (UE) positioning in NG-RAN(Release 15)", total 57 pages.

3GPP TS 37.355 V16.3.0 (Dec. 2020):"3rd Generation Partnership Project; Technical Specification Group Radio Access Network;LTE Positioning Protocol (LPP)(Release 16)" ,total 295 pages.

3GPP TS 36.459 V15.0.0 (Jun. 2018):"3rd Generation Partnership Project; Technical Specification Group Radio Access Network;Evolved Universal Terrestrial Radio Access Network (E-UTRAN); SLm interface Application Protocol (SLmAP) (Release 15)", total 47 pages.

3GPP TS 36.455 V15.0.0 (Jun. 2018):"3rd Generation Partnership Project; Technical Specification Group Radio Access Network; Evolved Universal Terrestrial Radio Access (E-UTRA); LTE Positioning Protocol A (LPPa)(Release 15)", total 83 pages.

3GPP TS 36.331 V15.2.2 (Jun. 2018):"3rd Generation Partnership Project; Technical Specification Group Radio Access Network; Evolved Universal Terrestrial Radio Access (E-UTRA); Radio Resource Control (RRC);Protocol specification (Release 15)", total 791 pages.

3GPP TS 36.305 V15.0.0 (Jul. 2018):"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN(Release 15)", total 85 pages.

Partial Supplementary European Search Report issued in corresponding European Application No. 22831680.8, dated Oct. 10, 2024, pp. 1-15.

* cited by examiner

LOS path

NLOS
path

POSITIONING METHOD AND APPARATUS

CROSS-REFERENCE TO RELATED APPLICATIONS

This application is a continuation of International Application No. PCT/CN2022/098474, filed on Jun. 13, 2022, which claims priority to Chinese Patent Application No. 202110750946.X, filed on Jul. 2, 2021. The disclosures of the aforementioned applications are hereby incorporated by reference in their entireties.

BACKGROUND

With rapid development of communication technologies, high-precision positioning has been gradually identified as important research projects in a 5th generation (5G) communication system. A positioning scenario in a new radio (NR) communication system includes: an enhanced mobile broadband (eMBB) outdoor scenario, an eMBB indoor scenario, an ultra-reliable and low latency communications (URLLC) scenario, a massive machine type of communication (mMTC)/internet of things (IOT) scenario, and the like. In addition, the communication system is to have features of high security, scalability, high availability, and precision guarantee in high-speed applications. As more positioning usage and positioning scenarios increasingly appear, a usage on positioning precision is increasingly high.

Positioning technologies is classified by quantity of involved base stations into multi-station positioning and single-station positioning. In multi-station positioning, a plurality of base stations are to measure a terminal device or a terminal device is to measure a plurality of base stations, to determine a location of the terminal device, for example, by using positioning technologies such as an uplink/downlink time difference of arrival (UL/DL-TDOA), an uplink angle-of-arrival (UL-AOA), a downlink angle-of-departure (DL-AOD), and a multi-round-trip time (Multi-RTT). However, in single-station positioning, generally, only one base station is to measure a terminal device and/or a terminal device is to measure only one base station, to determine a location of the terminal device.

During actual application, positioning precision is usually limited by some unavoidable non-ideal factors of a network system, such as a synchronization error between base stations and an antenna installation angle error. Any positioning technology is affected by one or more of the factors, resulting in lower positioning precision. As more positioning usage and application scenarios increasingly appear, a usage on positioning precision is increasingly high. How to overcome the non-ideal factors is the key to improving positioning precision.

As a signal is transmitted in a direct line-of-sight (LOS) path between a terminal device and a base station, or is transmitted through reflection or diffraction in a non-line-of-sight (NLOS) path. In response to the terminal device measuring, based on the foregoing positioning technology, a signal sent by the base station, the NLOS path is measured by the terminal device because the LOS path is blocked or for another reason. Because the LOS path and the NLOS path are different propagation paths, corresponding measurement results are different. In response to a measurement result corresponding to the NLOS path being used as a measurement result corresponding to the LOS path during positioning, there is a large positioning error obtained by the terminal device, and positioning precision is affected.

SUMMARY

Embodiments described herein provide a positioning method and apparatus. A reflection panel is introduced, so that in response to an LOS path being blocked, a signal reflected by the reflection panel is measured, to improve positioning precision of a terminal device.

According to a first aspect, a positioning method is provided, including: A location management network element sends first indication information to a network device, where the first indication information is useable by the network device to measure a non-line-of-sight (NLOS) path of a reflection panel; and the location management network element receives a measurement result of the network device, where the measurement result includes a receive-transmit time difference and an uplink angle-of-arrival that are obtained by the network device by measuring the NLOS path of the reflection panel; and the location management network element determines a location of a terminal device based on location information of the network device, location information of the reflection panel, and the measurement result, that is, the terminal device is located.

That the network device measures the NLOS path of the reflection panel is to measure a signal that is sent by the terminal device and that is reflected by the reflection panel. The NLOS path is an NLOS path for transmitting a signal between the network device and the terminal device. The signal sent by the terminal device arrives at the network device via the reflection panel. A transmission path of the signal is the NLOS path. A measurement result obtained by measuring the signal is a measurement result corresponding to the NLOS path.

Correspondingly, the network device receives the first indication information, and performs signal measurement based on the first indication information. To be specific, the network device measures the signal that is sent by the terminal device and that is reflected by the reflection panel, and feeds back the measurement result to the location management network element.

The location management network element is also referred to as a location center, for example, is a location management function (LMF) entity.

The NLOS path of the reflection panel is a propagation path of a signal reflected by the reflection panel, and is briefly referred to as a reflection path of the reflection panel that means a transmission path, of a signal reflected by the reflection panel, between the network device and the terminal device, that is, a transmission path of a signal that is between the network device and the terminal device and that is reflected by the reflection panel. For example, in response to a signal being sent from the terminal device and arriving at the network device after being reflected by the reflection panel, a propagation path of the signal is the NLOS path. On the contrary, in response to a signal being sent from the network device and arriving at the terminal device after being reflected by the reflection panel, a propagation path of the signal is also the NLOS path.

In an example, measuring a non-line-of-sight (NLOS) path of the reflection panel refers to measuring a signal reflected by the reflection panel, and a transmission path of the reflected signal is the NLOS path. That the first indication information is useable by the network device to measure a non-line-of-sight (NLOS) path of a reflection panel is specifically that the first indication information is useable by the network device to measure the signal that is sent by the terminal device and that is reflected by the reflection panel, and a measurement result obtained by the network device by measuring the NLOS path of the reflection panel is the measurement result obtained by the network device by measuring the signal reflected by the reflection panel.

The signal mentioned in at least one embodiment is a reference signal used for positioning measurement. For example, in response to the signal being sent by the terminal device and being measured by the network device, the signal is a sounding reference signal (SRS); or in response to the signal being sent by the network device and being measured by the terminal device, the signal is a positioning reference signal (PRS).

With reference to the foregoing solution, the first indication information is information about the reflection panel, for example, location range information of the reflection panel that indicates a location or a location range of the reflection panel. After receiving the location range information of the reflection panel, the network device measures a signal at the location or in the location range, to obtain a measurement result corresponding to the signal reflected by the reflection panel, namely, a measurement result corresponding to the NLOS path. During the measurement, the location or the location range indicated by the first indication information is expanded to some extent and used as a measurement range.

After receiving the location range information of the reflection panel, the network device converts the location or the location range of the reflection panel into a direction or a direction range of the reflection panel, and then measure a signal in the direction or the direction range, or expand the direction or the direction range to some extent and use the direction or the direction range as a measurement range.

With reference to the foregoing solution, the information about the reflection panel is alternatively direction range information of the reflection panel that indicates the direction or the direction range of the reflection panel. After receiving the direction range information of the reflection panel, the network device measures a signal in the direction or the direction range, to obtain a measurement result corresponding to the signal reflected by the reflection panel. During the measurement, the direction or the direction range indicated by the first indication information is expanded to some extent and used as a measurement range.

With reference to the foregoing solution, the first indication information is alternatively measurement range information that indicates a measurement range of the network device. After receiving the measurement range information, the network device measures a signal in the measurement range, or expands the measurement range to some extent and measures a signal in an expanded range. The measurement range is preset, to ensure that the signal reflected by the reflection panel is within the measurement range.

Expanding a signal detection range helps increase a possibility of detecting the signal reflected by the reflection panel. This enhances positioning performance.

In another example, the first indication information is useable by the network device to measure a signal reflected by the reflection panel, that is, is useable by the network device to measure a signal from a direction of the reflection panel, or is useable by the network device to measure a signal in a direction of the reflection panel. The direction of the reflection panel is a preset direction or direction range, or is a preset location or location range.

The first indication information includes location and/or direction information of the reflection panel. For example, the location information is coordinates or a coordinate range of the reflection panel, and is used to determine a location or a location range of the reflection panel. The direction information is used to determine the direction or a direction range of the reflection panel relative to the network device.

For example, the direction information includes one or more of the following: an orientation angle value, a zenith angle value, an orientation angle range, a zenith angle range, an angle range value, and the like.

With reference to the foregoing solution, the location information that is of the network device and that is used to determine the location of the terminal device is an accurate location of the network device, for example, coordinates of the network device. Further, the location information further includes a steering angle of the network device. The steering angle is also referred to as an orientation angle, an orientation rotation angle, or the like, and indicates an included angle between the network device and a preset reference direction. The steering angle is 0.

The location information that is of the reflection panel and that is used to determine the location of the terminal device is an accurate location of the reflection panel, for example, coordinates of the reflection panel that is coordinates of any point on a reflective surface of the reflection panel. Further, the location information further includes a steering angle of the reflection panel. The steering angle is also referred to as an orientation angle, an orientation rotation angle, or the like, and indicates an included angle between the reflection panel and a preset reference direction, that is, an included angle between the reflective surface of the reflection panel and the preset reference direction. The steering angle is 0.

Therefore, the first indication information is usable by a measurement range in which the network device measures a reference signal. The reflection panel is located within the measurement range, or the signal reflected by the reflection panel is located within the measurement range. Therefore, the network device measures the reflection path of the reflection panel, that is, the network device measures the signal reflected by the reflection panel, to obtain a measurement result corresponding to the reflection path of the reflection panel. Then, the terminal device is accurately located based on both the location information of the network device and the location information of the reflection panel. The method is applicable to single-station positioning, that is, only one network device is used.

With reference to the foregoing solution, the first indication information is carried in a measurement request, or is not carried in a measurement request, and is indication information that is separately sent. The measurement request is sent by using the NR (New Radio) Positioning Protocol A (NRPPa). For example, the measurement request is an NRPPa measurement request.

Further, the measurement request further includes one or more types of the following information: a station identifier and a measurement type.

With reference to the foregoing solution, the measurement result of the network device further includes second indication information. The second indication information indicates that the measurement result obtained by measuring the signal reflected by the reflection panel, for example, a receive-transmit time difference and an uplink angle-of-arrival, is a measurement result obtained through measurement based on the first indication information. For example, the second indication information indicates that the measurement result is obtained by measuring the signal reflected by the reflection panel, that is, the receive-transmit time difference and the uplink angle-of-arrival are a measurement result corresponding to the reflection path (namely, the NLOS path) of the reflection panel. After receiving the measurement result, the location management network element determines, based on the second indication information, that the measurement result is obtained by measuring the reflection path of the reflection panel.

For example, the second indication information is measurement range information that indicates a measurement range of a reference signal and that is a direction range or a location range in which the network device measures the reference signal. After receiving the measurement result, the location management network element determines, based on the included second indication information, that the measurement result is the measurement result obtained by measuring the signal reflected by the reflection panel, namely, the measurement result corresponding to the NLOS path.

In another example, the second indication information is information about the reflection panel, for example, an identifier of the reflection panel, a location or a location range of the reflection panel, a direction or a direction range of the reflection panel, that indicates that the measurement result is the measurement result corresponding to the reflection path of the reflection panel. After receiving the measurement result, the location management network element determines, based on the second indication information included in the measurement result, that the measurement result is the measurement result obtained by measuring the signal reflected by the reflection panel.

The second indication information is indicated by a bit, for example, is 1-bit indication information. In response to the second indication information being set to 1, the measurement result is the measurement result obtained through measurement based on the first indication information, that is, the measurement result is the measurement result corresponding to the reflection path of the reflection panel; in response to the second indication information is set to 0, the measurement result is not the measurement result obtained through measurement based on the first indication information, that is, the measurement result is not the measurement result corresponding to the reflection path of the reflection panel; and vice versa. Alternatively, the second indication information is indicated by a plurality of bits. This indication manner reduces signaling overheads.

The second indication information is carried in the measurement result, or is indication information separately sent by the network device to the location management network element.

With reference to the foregoing solution, in a possible design, the method further includes: The location management network element receives a measurement result sent by the terminal device, where the measurement result includes a receive-transmit time difference obtained by the terminal device by measuring the NLOS path of the reflection panel; and the location of the terminal device is determined by using the following method.

The location of the terminal device is determined based on the location information of the network device, the location information of the reflection panel, the measurement result of the terminal device, and the measurement result of the network device.

That the terminal device measures the NLOS path of the reflection panel is that the terminal device measures a signal that is sent by the network device and that is reflected by the reflection panel. A propagation path of the signal is the NLOS path, and the obtained measurement result is a measurement result corresponding to the NLOS path.

In the foregoing positioning solution, the measurement result of the terminal device is considered, so that more accurate positioning is achieved.

With reference to the foregoing solution, the method further includes: The location management network element sends location request information, also referred to as request location information, to the terminal device. The location request information includes third indication information. The third indication information indicates the terminal device to report a transmit beam corresponding to a measured reference signal. For example, the third indication information indicates the terminal device to report a resource identifier (resource ID). In this case, the terminal device is to include a resource ID in the measurement result that indicates the transmit beam corresponding to the measured reference signal, that is, a transmit beam on which the reference signal measured to obtain the measurement result is sent.

The third indication information is carried in the location request information, or is indication information that is separately sent.

Based on the third indication information, the measurement result sent by the terminal device to the location management network element includes fourth indication information. The fourth indication information is transmit beam information, for example, a resource ID that indicates a transmit beam corresponding to the measurement result, that is, a transmit beam measured to obtain the measurement result. After receiving the measurement result sent by the terminal device, the location management network element determines, based on the included fourth indication information, whether the measurement result is obtained by measuring the signal reflected by the reflection panel, and determines, based on a beam direction, whether the measurement result reported by the terminal device is a measurement result corresponding to the NLOS path of the reflection panel.

The fourth indication information is included in the measurement result, or is indication information that is separately sent.

For example, in response to the transmit beam indicated by the fourth indication information corresponding to the measurement result reported by the terminal device facing the direction of the reflection panel, a determination is made that the measurement result is the measurement result obtained by measuring the signal reflected by the reflection panel; or in response to the transmit beam indicated by the fourth indication information corresponding to the measurement result not facing the direction of the reflection panel, a determination is made that the measurement result is not the measurement result obtained by measuring the signal reflected by the reflection panel.

In the foregoing solution, the reflection panel is introduced, and the location management network element indicates the network device to measure the signal reflected by the reflection panel. Therefore, positioning accuracy based on NLOS path measurement is improved, and the solution is applicable to single-station positioning. Especially in some cases, in response to an LOS path being blocked and a signal on the LOS path not being measured, positioning precision similar to that in response to the LOS path being measured is also obtained by measuring the signal reflected by the reflection panel and performing positioning based on the measurement result corresponding to the NLOS path of the reflection panel.

With reference to the solution in the first aspect, in another implementation, the first indication information is alternatively an identifier of the reflection panel. The network device stores a correspondence between the identifier and the location range information that are of the reflection panel. The network device determines, based on the correspondence and the first indication information, the location or the location range of the reflection panel, and then measure a reference signal at the location or in the location range, or expands the location or the location range to some extent and use the location or the location range as a measurement range. Alternatively, the network device converts the location or the location range of the reflection panel into the direction or the direction range of the reflection panel, and then perform measurement, or expands the direction or the direction range to some extent and use the direction or the direction range as a measurement range.

In another example, the first indication information is alternatively an identifier of the reflection panel. The network device stores a correspondence between the identifier and the direction range information that are of the reflection panel. The network device determines, based on the correspondence and the first indication information, the direction or the direction range of the reflection panel, and then measure a reference signal in the direction or the direction range, or expands the direction or the direction range to some extent and use the direction or the direction range as a measurement range.

In another example, the first indication information is alternatively a measurement range identifier. The network device stores a correspondence between the measurement range identifier and a measurement range. The network device determines, based on the correspondence and the first indication information, the measurement range, and then measure a reference signal in the range, or expands the range to some extent and use the range as a measurement range.

With reference to the foregoing solution, the second indication information is alternatively an identifier of the reflection panel. After receiving a measurement result, the location management network element determines, based on the identifier of the reflection panel, that the measurement result is a measurement result obtained by measuring a reference signal reflected by the reflection panel. In response to a plurality of reflection panels being disposed, a specific reflection panel reflecting the reference signal that is measured to obtain the measurement result is determined.

The location management network element stores a correspondence between the identifier of the reflection panel and location information (or direction information or measurement range information) of the reflection panel, and determines, based on the identifier of the reflection panel included in the measurement result, the location information or the direction information that is of the reflection panel and that is used for positioning. The location information or the direction information includes coordinates, and further includes a steering angle.

In the foregoing solution, a plurality of reflection panels is disposed, which is applicable to various complex positioning scenarios and expands a positioning range of the terminal device. Because the first indication information includes only the identifier of the reflection panel, signaling overheads are reduced.

For other content of the foregoing solution that is similar to content in the first aspect, refer to the descriptions in the first aspect. Details are not described again.

According to a second aspect, a positioning and calibration method is provided, and a reflection panel is introduced. In response to both an LOS path and an NLOS path being measured, orientations of the reflection panel and a network device is calibrated according to the method, and a terminal device is also accurately located.

The method includes: A location management network element sends first indication information to the network device, where the first indication information is useable by the network device to measure an NLOS path of the reflection panel; and the location management network element receives a measurement result of the network device, where the measurement result includes a receive-transmit time difference and an uplink angle-of-arrival that are obtained by the network device by measuring the NLOS path of the reflection panel, and a receive-transmit time difference and an uplink angle-of-arrival that are obtained by the network device by measuring the LOS path; and the location management network element determines, based on location information of the network device, location information of the reflection panel, and the measurement result, at least one of the following: a location of the terminal device, a steering angle of the network device, and a steering angle of the reflection panel.

Similar to the first aspect, measuring the NLOS path of the reflection panel is measuring a signal reflected by the reflection panel; and measuring the LOS path is measuring a signal on the LOS path. The signal on the LOS path is a signal that is directly transmitted without being blocked between the terminal device and the network device.

Correspondingly, the network device receives the first indication information, and performs signal measurement based on the first indication information, that is, measures a signal that is sent by the terminal device and that is reflected by the reflection panel, and feeds back the measurement result to the location management network element.

The location information of the network device and the location information of the reflection panel are respectively an accurate location of the network device and an accurate location of the reflection panel, for example, coordinates of the network device and coordinates of the reflection panel, and does not include a steering angle. Steering angles of the network device and the reflection panel is obtained through calculation based on the measurement results corresponding to the NLOS path and the LOS path in combination with the coordinates of the network device and the coordinates of the reflection panel.

The receive-transmit time difference obtained by measuring the LOS path is smaller than the receive-transmit time difference obtained by measuring the NLOS path. Generally, a minimum receive-transmit time difference obtained by measurement is used as the receive-transmit time difference of the LOS path.

In an example, measurement of the NLOS path of the reflection panel is specifically measurement of the signal reflected by the reflection panel. That the first indication information is useable by the network device to measure a non-line-of-sight (NLOS) path of the reflection panel is specifically that the first indication information is useable by the network device to measure a signal that is sent by the terminal device and that is reflected by the reflection panel. That the network device measures the NLOS path of the reflection panel is specifically that the network device measures the signal that is sent by the terminal device and that is reflected by the reflection panel. The measurement result is a measurement result corresponding to the NLOS path.

That the network device measures the LOS path is that the network device measures a signal that is sent by the terminal device and that directly arrives at the network device. To be specific, the network device measures a signal sent by the terminal device on the LOS path. The obtained measurement result is a measurement result corresponding to the LOS path.

Different from the solution in the first aspect, in this solution, the measurement result corresponding to the LOS path is used, to locate the terminal device in combination with the measurement result corresponding to the NLOS path of the reflection panel. Further, an orientation of the reflection panel and/or the network device is calibrated. Alternatively, positioning and calibration is performed simultaneously.

Similar to the solution in the first aspect, the first indication information is carried in a measurement request. Alternatively, the first indication information is not carried in the measurement request, and is indication information that is separately sent. The measurement result sent by the network device includes second indication information. Other content is similar to that in the first aspect. For example, details are as follows:

Content of the location management network element, the first indication information, the measurement request, the second indication information, and the like is similar to that in the solution in the first aspect. Details are not described again.

With reference to the solution in the second aspect, the method further includes: the location management network element receives a measurement result of the terminal device. The measurement result includes a receive-transmit time difference obtained by the terminal device by measuring the NLOS path of the reflection panel, and a receive-transmit time difference obtained by the terminal device by measuring the LOS path.

That the terminal device measures the NLOS path of the reflection panel is specifically that the terminal device measures a signal that is sent by the network device and that is reflected by the reflection panel, and the obtained measurement result is a measurement result corresponding to the NLOS path.

That the terminal device measures the LOS path is specifically that the terminal device measures a signal that is sent by the network device and that directly arrives at the terminal device. To be specific, the terminal device measures a signal sent by the network device on the LOS path, and the obtained measurement result is a measurement result corresponding to the LOS path.

The determining, based on location information of the network device, location information of the reflection panel, and the measurement result, at least one of the following: a location of the terminal device, a steering angle of the network device, and a steering angle of the reflection panel includes: determining, based on the location information of the network device, the location information of the reflection panel, the measurement result of the network device, and the measurement result of the terminal device, at least one of the following: the location of the terminal device, the steering angle of the network device, and the steering angle of the reflection panel.

In the foregoing solution, the measurement result of the terminal device is considered, so that positioning and calibration are more accurate.

Other content such as third indication information and fourth indication information is similar to that in the solution in the first aspect. Details are not described again.

Further, the location management network element obtains the steering angle of the network device and/or the steering angle of the reflection panel, and notifies the network device of the steering angle of the network device and/or the steering angle of the reflection panel, so that the network device calibrates the steering angle of the network device. Alternatively, the network device actively performs numerical compensation in other calculations in response to the steering angle of the network device and/or the steering angle of the reflection panel being used, thereby improving network performance.

Further, the network device notifies a terminal device of maintenance personnel of the steering angle of the network device and/or the steering angle of the reflection panel, for example, notify a mobile phone of the maintenance personnel by using an SMS message, so that the maintenance personnel maintain the reflection panel and the network device, for example, performs manual calibration or electronic calibration on the steering angle of the network device and the steering angle of the reflection panel.

In the foregoing solution, the reflection panel is introduced, and the location management network element indicates the network device to measure a reference signal of the reflection panel. Therefore, positioning precision of multipath measurement is improved, and the solution is applicable to single-station positioning. Further, the orientations of the reflection panel and the network device is calibrated.

With reference to the solution in the second aspect, in another implementation, the first indication information is alternatively an identifier of the reflection panel. The network device stores a correspondence between the identifier and the location range information that are of the reflection panel. The network device determines, based on the correspondence and the first indication information, the location or the location range of the reflection panel, and then measure a reference signal at the location or in the location range, or expands the location or the location range to some extent and use the location or the location range as a measurement range. Alternatively, the network device converts the location or the location range of the reflection panel into the direction or the direction range of the reflection panel, and then perform measurement, or expands the direction or the direction range to some extent and use the direction or the direction range as a measurement range.

In another example, the first indication information is alternatively an identifier of the reflection panel. The network device stores a correspondence between the identifier and the direction range information that are of the reflection panel. The network device determines, based on the correspondence and the first indication information, the direction or the direction range of the reflection panel, and then measure a reference signal in the direction or the direction range, or expands the direction or the direction range to some extent and use the direction or the direction range as a measurement range.

In another example, the first indication information is alternatively a measurement range identifier. The network device stores a correspondence between the measurement range identifier and a measurement range. The network device determines, based on the correspondence and the first indication information, the measurement range, and then measure a reference signal in the range, or expands the range to some extent and use the range as a measurement range.

With reference to the foregoing solution, the second indication information is alternatively an identifier of the reflection panel. After receiving a measurement result, the location management network element determines, based on the identifier of the reflection panel, that the measurement result is a measurement result obtained by measuring a reference signal reflected by the reflection panel. In response to a plurality of reflection panels being disposed, a specific reflection panel reflecting the reference signal that is measured to obtain the measurement result is determined.

The location management network element stores a correspondence between an identifier of a reflection panel and location information of the reflection panel, and determines location information that is of the reflection panel and that is used for positioning based on the identifier that is of the reflection panel and that is included in the measurement result. The location information includes coordinates, and further includes a steering angle.

Content of some additional features in the second aspect is similar to that in the first aspect. For details, refer to the description of the first aspect. Details are not described again.

In the foregoing solution, a plurality of reflection panels is disposed, which is applicable to various complex positioning scenarios and expands a positioning range of the terminal device. Because the first indication information includes only the identifier of the reflection panel, signaling overheads are reduced. In this solution, the plurality of reflection panels is calibrated separately.

According to a third aspect, at least one embodiment further provides a communication device. The communication device implements functions performed by the location management network element in a possible design of the first aspect or the second aspect, and the functions is implemented by hardware executing corresponding software. The hardware or the software includes one or more modules corresponding to the functions, for example, a transceiver module. The transceiver module includes a sending module and a receiving module that respectively send and receive a signal or information. Further, a processing module is further included, configured to perform a step other than the sending and receiving steps.

For example, the communication device is the location management network element in the method according to the first aspect, and includes:

- a sending module, configured to send first indication information to a network device; a receiving module, configured to receive a measurement result of the network device; and a processing module, configured to determine a location of a terminal device based on location information of the network device, location information of a reflection panel, and the measurement result.

For example, the communication device is the location management network element in the method according to the second aspect, and includes:

- a sending module, configured to send first indication information to a network device; a receiving module, configured to receive a measurement result of the network device; and a processing module, configured to determine, based on location information of the network device, location information of a reflection panel, and the measurement result, at least one the following: a location of a terminal device, a steering angle of the network device, and a steering angle of the reflection panel.

Functions of the communication device are completely consistent with those of the location management network element in the foregoing method. For related functions, refer to the descriptions of the location management network element in the first aspect or the second aspect. Details are not described again.

According to still another aspect, the communication device is alternatively the network device in the foregoing positioning method, and includes:

- a receiving module, configured to receive first indication information sent by a location management network element;
- a processing module, configured to perform signal measurement based on the first indication information; and
- a sending module, configured to send a measurement result to the location management network element.

Functions of the communication device are completely consistent with those of the network device in the foregoing method. For related functions, refer to the descriptions of the network device in the first aspect or the second aspect. Details are not described again.

Alternatively, the communication device is a chip or a functional module in the location management network element or the network device. Therefore, sending corresponds to an output function of the chip, and receiving corresponds to an input function of the chip.

According to still another aspect, a communication system is provided, including the foregoing location management network element and network device.

According to still another aspect, a communication apparatus is provided. The communication apparatus includes one or more processors, configured to execute a computer program or instructions in a memory. In response to the one or more processors executing the computer program or the instructions, the communication apparatus is enabled to perform the solution in any one of the foregoing aspects.

In a possible design, the communication apparatus further includes one or more communication interfaces. The one or more communication interfaces are coupled to the one or more processors, and the one or more communication interfaces are configured to communicate with another module outside the communication apparatus.

In a possible design, the communication apparatus further includes one or more memories. The one or more memories are coupled to the one or more processors, and the one or more memories are configured to store the foregoing computer program or instructions. In a possible implementation, the memory is located outside the communication apparatus. In another possible implementation, the memory is located inside the communication apparatus. In still another possible implementation, the processor and the memory is alternatively integrated into one device. In other words, the processor and the memory is alternatively integrated together.

According to still another aspect, a communication apparatus is provided. The communication apparatus includes an interface circuit and a logic circuit. The interface circuit is coupled to the logic circuit. The logic circuit is configured to perform the solution in any one of the foregoing aspects. The interface circuit is configured to communicate with another module outside the communication apparatus.

According to still another aspect, a communication apparatus is provided. The communication apparatus includes a processor, and the processor is configured to perform the solution in any one of the foregoing aspects.

According to still another aspect, a computer-readable storage medium is provided. The computer-readable storage medium stores computer instructions or a computer program. In response to the computer instructions or the computer program or both being run on a computer, the computer is enabled to perform the solution in any one of the foregoing aspects.

According to still another aspect, a computer program product including computer instructions is provided. In response to the computer program product being run on a computer, the computer is enabled to perform the solution in any one of the foregoing aspects.

According to still another aspect, at least one embodiment provides a computer program. In response to the computer program being run on a computer, the computer is enabled to perform the solution in any one of the foregoing aspects.

According to still another aspect, a communication system is provided. The communication system includes the location management network element and the network device in the third aspect. The network device is configured to: receive first indication information sent by the location management network element, perform signal measurement based on the first indication information, and report a measurement result to the location management network element.

DESCRIPTION OF EMBODIMENTS

The following describes implementations of embodiments of this application in detail with reference to the accompanying drawings.

A positioning method provided in at least one embodiment is applied to any communication system, for example, a long term evolution (LTE) system, a 5G mobile communication system, an NR (New Radio) vehicle-to-everything (V2X) system, another next-generation communication system, or another communication system. This is not limited.

The positioning method provided in at least one embodiment is applied to various communication scenarios, for example, is applied to one or more of the following communication scenarios: eMBB, URLLC, MTC, mMTC, device-to-device (D2D), V2X, vehicle-to-vehicle (V2V), and IoT. The following describes, by using FIG. 1 as an example, a positioning method provided in at least one embodiment.

Figures 1, 2:
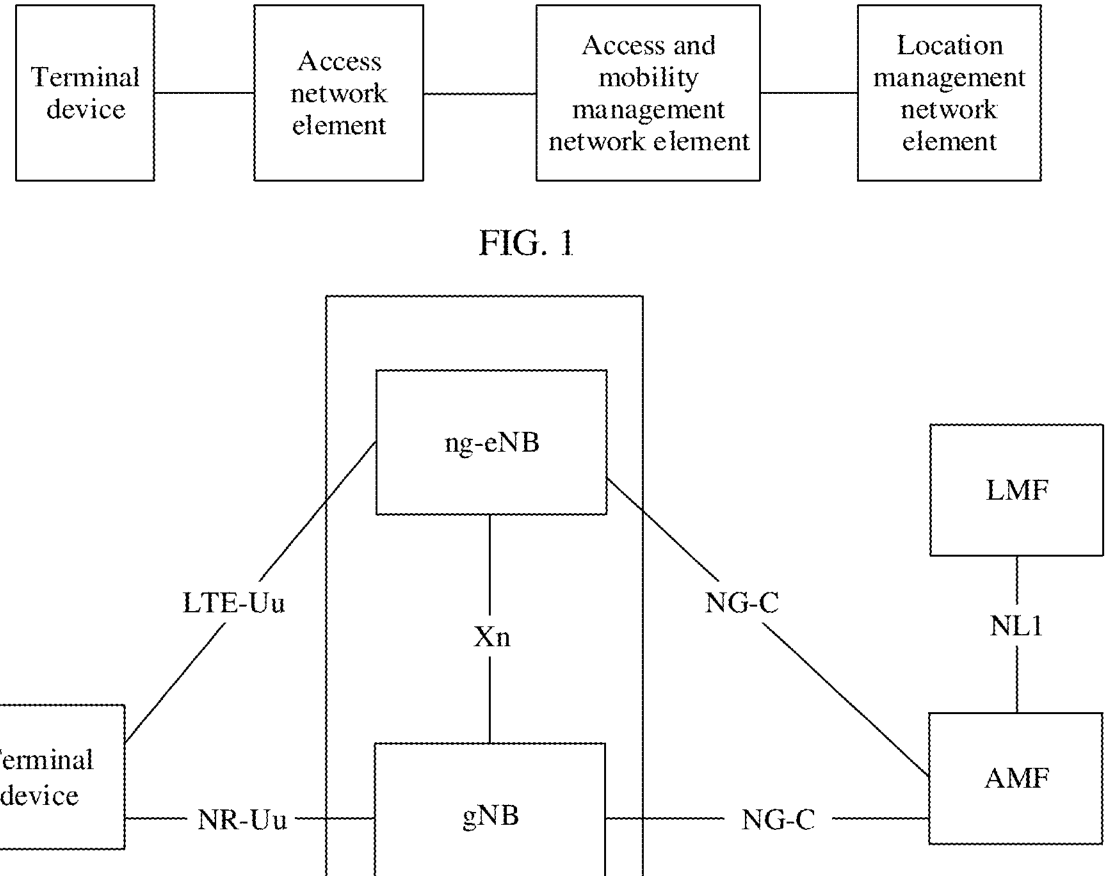
FIG. 1 is a schematic diagram of composition of a communication system according to at least one embodiment.
FIG. 2 is a schematic diagram of composition of a communication system according to at least one embodiment.

FIG. 1 is a schematic diagram of a communication system according to at least one embodiment. As shown in FIG. 1, the communication system includes a terminal device, an access network element, and a core network element. The core network element includes an access and mobility management network element and a location management network element.

The terminal device in FIG. 1 is located in a beam/cell coverage area of the access network element. The terminal device communicates with the access network element through a Uu link.

The terminal device (terminal device) in FIG. 1 is also referred to as user equipment (UE), a mobile station (MS), a mobile terminal (MT), or the like. Specifically, the terminal device in FIG. 1 is a handheld device, a vehicle-mounted device, a wearable device, a computing device, or the like that has a wireless communication function. For example, the terminal device is a mobile phone (mobile phone), a tablet computer, or a computer having a wireless transceiver function. Alternatively, the terminal device is a virtual reality (VR) terminal device, an augmented reality (AR) terminal device, a terminal device (such as a camera) in industrial control, a terminal device in self-driving, a terminal device in telemedicine, a terminal device in a smart grid, a terminal device (such as a camera) in a smart city (smart city), a household appliance (such as a refrigerator, a color television, an air conditioner, a fan, and a game console) in a smart home (smart home), a vehicle-mounted terminal device, a vehicle-mounted module, a vehicle having a vehicle-to-vehicle (V2V) communication capability, an intelligent vehicle, an unmanned aerial vehicle having a communication capability, or the like. This is not limited.

The access network element in FIG. 1 is any device that has a wireless transceiver function and that is configured to connect the terminal device to the core network element. The access network element is mainly configured to implement functions such as radio physical control, resource scheduling, radio resource management, radio access control, mobility management, quality of service management, and data encryption and compression, and provides reliable wireless transmission protocols and data encryption protocols. The access network element is also referred to as an access network (AN) device, a radio access network (RAN) device, a network device, or the like. Specifically, the access network element is a device supporting wired access, or is a device supporting wireless access. For example, the access network element is a macro base station, a micro base station, a relay station, an access point, or the like.

For example, as shown in FIG. 2, the access network element in at least one embodiment is a base station, or is a 4G base station, a 5G base station, or a base station in a future communication system. The base station in 5G NR is also referred to as a transmission reception point (TRP), a next generation NodeB (gNB), or the like. The 4G base station is an evolved NodeB (evolved NodeB, eNB, or eNodeB), a next generation evolved NodeB (ng-eNB), or the like in an LTE (Long Term Evolution) system. Alternatively, the access network element is an enhanced NodeB (eNB), a next generation evolved node (ng-eNB), an access point (AP), a transmission point (TP), or another access node, or the like. This is not limited. The gNB and the ng-eNB are connected through an Xn interface.

A core network includes a location management function (LMF) entity and an access and mobility management function (AMF) entity. The AMF is connected to the ng-eNB/gNB through an NG-C interface. The LMF is also referred to as a location server or a location center, and the LMF is connected to the AMF through an NL1 interface. The LMF is responsible for supporting different types of location services related to the terminal device, including positioning the terminal device and transferring assistance data to the terminal device.

Information exchange that is performed by the LMF, the access network element, and the terminal device includes the following several types: (1) The LMF exchanges information with the access network element by using an NR Positioning Protocol A (NRPPa) message, for example, to obtain a positioning reference signal (PRS), sounding reference signal (SRS) configuration information, cell timing, and cell location information, and communication between the LMF and the access network element is relayed by using the AMF; and (2) the LMF exchanges information with the terminal device by using an LTE Positioning Protocol (LPP) message, for example, terminal device capability information transfer, assistance information transfer, and positioning measurement information transfer. A name that is of the LPP message and that is set in LTE is still used, and is changed to another name, for example, the NR Positioning Protocol (NRPP/NPP). Communication between the LMF and the terminal device is relayed by using the AMF and the access network element.

At least one embodiment is not limited to the system architecture shown in FIG. 2, and is further applied to another future communication system, for example, a 6th generation (6G) communication system architecture. In addition, in a future communication system, a function of a network element in at least one embodiment remains the same while a name of the network element changes.

Figure 3:
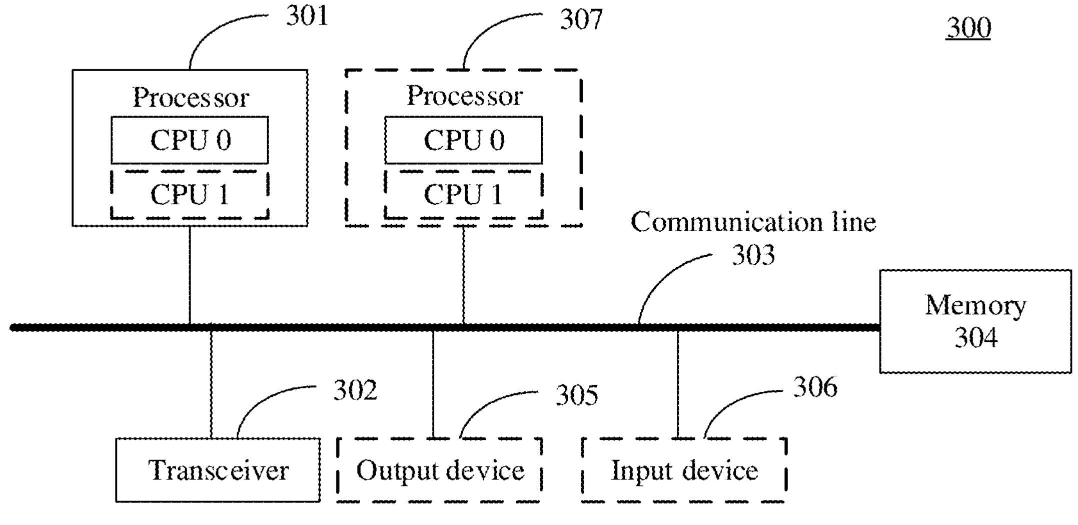
FIG. 3 is a schematic diagram of a structure of a communication apparatus according to at least one embodiment.

During specific implementation, as shown in FIG. 1, for example, the terminal device, the access network element, and the core network element (including the location management network element and the access and mobility management network element) all use a composition structure shown in FIG. 3, or include components shown in FIG. 3. FIG. 3 is a schematic diagram of composition of a communication apparatus 300 according to at least one embodiment. The communication apparatus 300 is a terminal device or a chip or a functional module in a terminal device, or is an access network element or a chip or a functional module in an access network element, or is a core network element or a chip or a functional module in a core network element. As shown in FIG. 3, the communication apparatus 300 includes a processor 301, a transceiver 302, and a communication line 303.

Further, the communication apparatus 300 includes a memory 304. The processor 301, the memory 304, and the transceiver 302 is connected through the communication line 303.

The processor 301 is a central processing unit (CPU), a general-purpose processor, a network processor (NP), a digital signal processor (DSP), a microprocessor, a microcontroller, a programmable logic device (PLD), or any combination thereof. Alternatively, the processor 301 is another apparatus having a processing function, for example, a circuit, a device, or a software module. This is not limited.

The transceiver 302 is configured to communicate with another device or another communication network. The another communication network is an Ethernet, a radio access network (RAN), a wireless local area network (WLAN), or the like. The transceiver 302 is a module, a circuit, a transceiver, or any apparatus that implements communication.

The transceiver 302 is mainly configured to receive and send a signal, and includes a transmitter and a receiver that respectively send and receive a signal. Operations other than signal receiving and sending are implemented by the processor, such as information processing and calculation.

The communication line 303 is configured to transmit information between the components included in the communication apparatus 300.

In a design, the processor is considered as a logic circuit, and the transceiver is considered as an interface circuit.

Further, the communication apparatus 300 further includes the memory 304, configured to store instructions. The instructions is a computer program.

The memory 304 is a read-only memory (ROM) or another type of static storage device that stores static information and/or instructions, or is a random access memory (RAM) or another type of dynamic storage device that stores information and/or instructions, or is an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

The memory 304 is independent of the processor 301, or is integrated with the processor 301. The memory 304 is configured to store instructions, program code, some data, or the like. The memory 304 is located inside the communication apparatus 300, or is located outside the communication apparatus 300. This is not limited. The processor 301 is configured to execute the instructions stored in the memory 304, to implement a method provided in at least one embodiment.

In an example, the processor 301 includes one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 further includes a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker (speaker).

The communication apparatus 300 is a base station, a network server, a wireless terminal device, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus includes more or fewer components than those shown in FIG. 3, or combine some components, or have different component arrangements.

In at least one embodiment, the chip system includes a chip, or includes a chip and another discrete device.

In addition, for operations, terms, and the like in at least one embodiment, refer to each other. This is not limited. In at least one embodiment, names of messages exchanged between devices, names of parameters in the messages, or the like are merely examples. Another name is alternatively used during specific implementation. This is not limited.

The following briefly describes positioning technologies.

Based on classification by signal measurement manner, the positioning technologies includes an uplink positioning technology, a downlink positioning technology, and an uplink and downlink positioning technology. In the uplink positioning technology, an access network element detects a channel sounding reference signal (SRS) sent by a terminal device. In the downlink positioning technology, a terminal device detects a positioning reference signal (PRS) sent by an access network element. In the uplink and downlink positioning technology, a terminal device detects a PRS signal sent by an access network element, and the access network element also detects an SRS signal sent by the terminal device.

For example, the uplink positioning technology includes an uplink time difference of arrival (UL-TDOA) technology and an uplink angle-of-arrival (UL-AOA) technology. The downlink positioning technology includes a downlink time difference of arrival (downlink time difference of arrival, DL-TDOA) technology and a downlink angle-of-departure (DL-AOD) technology. The uplink and downlink positioning technology includes a multi-round-trip time (Multi-RTT) technology.

The DL-TDOA is a multi-station positioning technology. A terminal device reports signal delays between the terminal device and a plurality of access network elements to a location center, and the location center determines a location of the terminal device by using a delay-based calculation method. The DL-AOD is also a multi-station positioning technology. The location center determines the location of the terminal device by measuring an angle based on measurement values of a reference signal received power (RSRP) that is reported by the terminal device and that is between the terminal device and the plurality of access network elements and a transmit beam pattern of each access network element.

Figure 4:
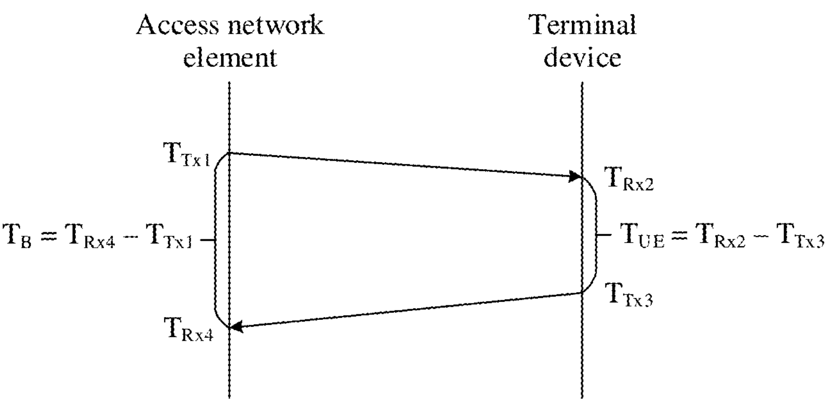
FIG. 4 is a schematic diagram of a multi-station positioning technology according to at least one embodiment.

The Multi-RTT positioning technology is a multi-station positioning technology in which at least three stations are to be used. An access network element is to measure a signal sent by a terminal device, and the terminal device also is to measure a signal sent by the access network element. FIG. 4 is a schematic diagram of time measurement performed by two network elements. A time at which an access network element sends a signal is denoted as $T_{Tx1}$, and a time at which a terminal device receives the signal is denoted as $T_{Rx2}$. A time at which the terminal device sends a signal is denoted as $T_{Tx3}$, and a time at which the access network element receives the signal is denoted as $T_{Rx4}$. The access network element measures a signal receive-transmit time difference $T_B=T_{Rx4}-T_{Tx1}$ and reports the signal receive-transmit time difference to a location center. The terminal device measures a signal receive-transmit time difference $T_{UE}=T_{Rx2}-T_{Tx3}$ and also reports the signal receive-transmit time difference to the location center. The location center deduces a signal propagation round-trip time $RTT=T_B+T_{UE}$, and calculates, based on a relationship between a distance, a time, and a speed of light, a distance between the access network element and the terminal device.

Figures 5, 6A:
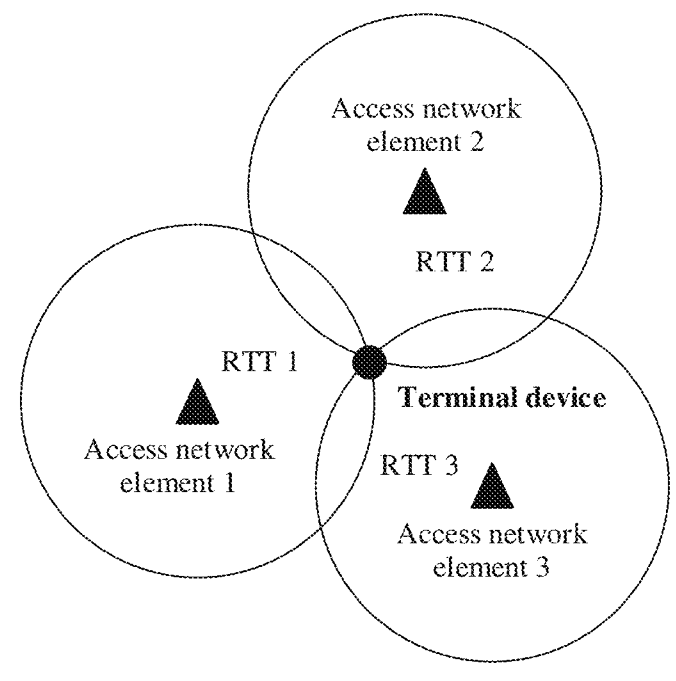
FIG. 5 is a schematic diagram of a multi-station positioning technology according to at least one embodiment.
FIG. 6A is a schematic diagram of an LOS path and an NLOS path according to at least one embodiment.

During positioning calculation, a circle is drawn, based on the measured RTT value, with a location of each access network element as a center. A radius of the circle is a distance corresponding to the RTT. Three circles is drawn based on three RTTs, and an intersection point of the three circles is the location of the terminal device. As shown in FIG. 5, three base stations correspond to three circles, and an intersection point of the three circles is the location of the terminal device.

In response to there being no obstacle between the access network element and the terminal device, a propagation path of a radio signal between a transmitting end and a receiving end is a direct path. In this case, this is referred to as line-of-sight (LOS) communication, and the propagation path of the radio signal is referred to as an LOS path. In response to there being an obstacle, a radio signal is sent from a transmitting end, and arrives at a receiving end through reflection, scattering, and diffraction of another object. In this case, this is referred to as non-line-of-sight (NLOS) communication, and a propagation path of the radio signal is referred to as an NLOS path. That is, the radio signal does not arrive at the receiving end directly from the transmitting end, but arrives at the receiving end through reflection, scattering, diffraction, and the like of another object. FIG. 6A shows a schematic diagram of the LOS path and the NLOS path.

As a signal is transmitted in a direct LOS path between the terminal device and the access network element, or is reflected or diffracted by a wall or another object and be transmitted in a NLOS path. A location of the terminal device obtained through calculation based on a measurement value corresponding to the LOS path is more accurate than that corresponding to the NLOS path. In the Multi-RTT positioning technology, three base stations are usually used for measurement. However, a great probability that three (or more than three) base stations measure the LOS path cannot be ensured. In response to there being a measurement result corresponding to one NLOS path, a positioning error is large.

Figure 6B:
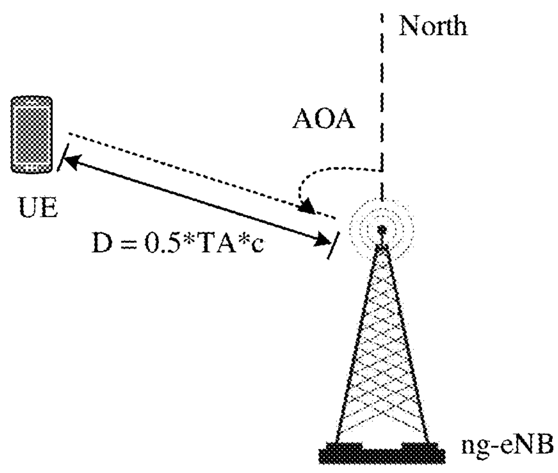
FIG. 6B is a schematic diagram of a single-station positioning technology according to at least one embodiment.

In addition to the multi-station positioning technology, there is a single-station positioning technology. Refer to FIG. 6B. A positioning principle of the technology is that a direction of a terminal device is obtained first by using an uplink angle-of-arrival (AOA) measured by a base station, a distance between the terminal device and the base station is then obtained based on a TA (time advance), namely, a receive-transmit time difference, measured by the base station and the terminal device, and finally, the terminal device is located based on measurement values of the AOA and the TA. In the NR protocol that a base station (for example, a ng-eNB or a gNB) supports AOA measurement on a terminal device, and a measured AOA is an angle in which a direction of due north is a normal line direction and a counterclockwise direction is positive. The TA is jointly measured by the terminal device and the base station, or is measured only by the base station. In response to the terminal device not supporting a function of measuring and reporting a positioning reference signal, the terminal device is still located based on only a measurement value reported by the base station. For example, a receive-transmit time difference measured by the terminal device is ignored, and a distance between the terminal device and the base station is determined based on only a receive-transmit time difference measured by the base station. In this case, the terminal device is still located by using only one base station.

However, during installation of a base station antenna, a manual operation usually causes an error in installation posture, such as a direction or a location, of the base station antenna. Such an error is usually not large. However, for a terminal device that is far away, even in response to the error being only 1°, there is a great distance deviation during positioning.

As a signal is transmitted in a direct LOS path between the terminal device and the access network element, or is reflected or diffracted by a wall or another object and be transmitted in a NLOS path. A location of the terminal device obtained through calculation based on a measurement value corresponding to the LOS path is more accurate than that corresponding to the NLOS path. In response to the terminal device measuring a signal sent by the access network element, the terminal device selects a signal corresponding to a path that enables earliest arrival or a signal corresponding to a path with strongest energy. In this case, a propagation path of the signal is usually an LOS path, and a delay or an angle of the signal is measured.

However, due to an environment or for another reason, the LOS path is blocked, that is, there is an obstacle between the access network element and the terminal device, and the access network element and the terminal device cannot accurately detect the LOS path. Positioning is performed only based on a measurement result obtained by measuring an NLOS path. Consequently, there is a large error of a determined location of the terminal device, and positioning precision is affected.

At least one embodiment provides a positioning method. A reflection panel is introduced, even in response to an LOS path being blocked and not being measured, a terminal device is accurately located by using a measurement result corresponding to an NLOS path of the reflection panel. A reflection path is generated in response to the reflection panel reflecting a signal. In response to the reflection panel being installed at an accurate location, in response to a signal of the reflection path, namely, a signal in an NLOS path, of the reflection panel being accurately measured, positioning precision similar to that in positioning by measuring the LOS path is also obtained by using a measurement result corresponding to the NLOS path.

In addition, in response to a signal on the LOS path being detected to obtain a measurement result corresponding to the LOS path, and a signal in the NLOS path of the reflection panel also being detected to obtain a measurement result corresponding to the NLOS path, the measurement results of the plurality of paths is used to perform accurate positioning on the terminal device. Further, an orientation of the access network element or the reflection panel is calibrated.

The positioning and calibration method mentioned above uses only one access network element, that is, is applicable to a single-station positioning scenario.

Generally, electromagnetic waves is reflected through a wall, glass, a metal door, or the like in an environment. A material of the reflection panel and smoothness of a surface affect reflection effect. For example, a smooth aluminum plate has high reflectivity, and a rough brick wall has low reflectivity. In response to a reflective surface being rough, diffuse reflection occurs, and reflected signals received by a receiving end are a cluster. Determining a measurement value and a location of a reflection point is difficult. In response to the material of the reflection panel absorbing some electromagnetic waves, energy of the reflection path is excessively low, and consequently the receiving end cannot detect information about the reflection path. Therefore, the reflection panel preferentially uses a material with high reflectivity.

To enable the reflected signal to be accurately detected, in this solution, a reflection panel is installed to generate a reflection path. The reflection panel has high reflectivity, and a surface is smooth and implements specular reflection (or approximate specular reflection). The following describes a specific positioning and calibration calculation solution from two aspects: location calculation and orientation correction.

Figure 7:
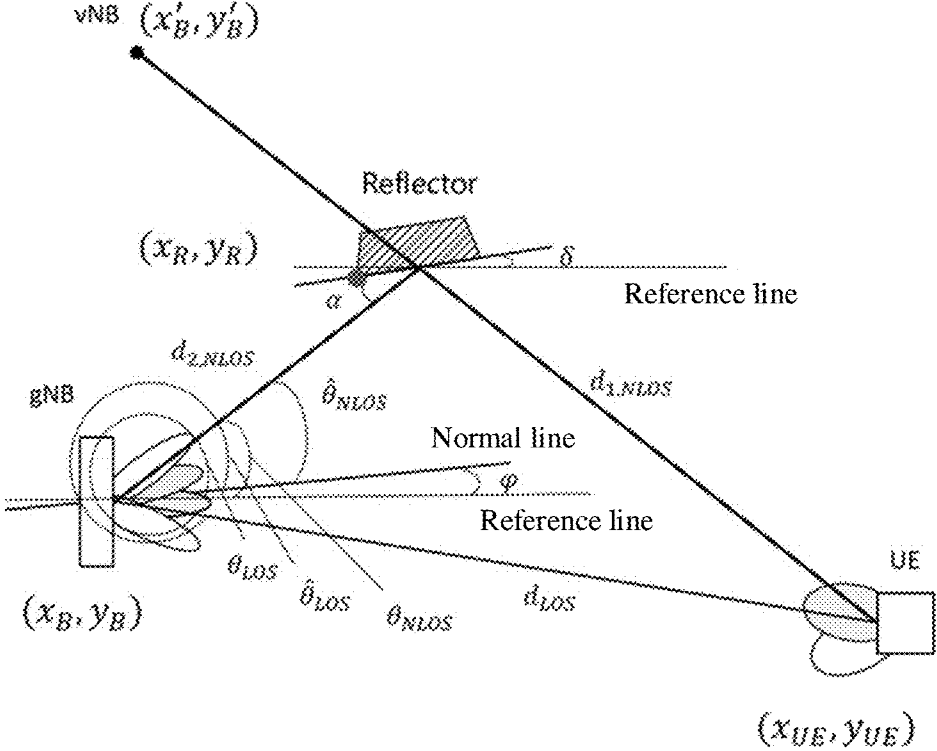
FIG. 7 is a schematic diagram of signal propagation in a positioning method according to at least one embodiment.

FIG. 7 is a schematic diagram of signal propagation according to at least one embodiment. In the figure, an access network element is a base station, for example, a gNB, a terminal device is UE, and a reflective surface of a reflection panel is a reflector, where the reflective surface is considered as a reflection panel. Coordinates of the base station are $(x_B, y_B)$. Coordinates of the reflection panel are $(x_R, y_R)$, and is coordinates of any point on the reflective surface of the reflection panel. Coordinates of the UE are $(x_{UE}, y_{UE})$. A reference line is a ray pointing to a preset direction, for example, due east or due north. An included angle between the reflective surface and the reference line is $\delta$ (referred to as a rotation angle or a steering angle of the reflection panel below), and $\delta$ is 0, that is, the reflective surface overlaps the reference line. An included angle between a normal line of the base station and the reference line is $\varphi$ (referred to as an orientation rotation angle of the base station, and briefly referred to as a steering angle of the base station), and $\varphi$ is 0, that is, the normal line of the base station overlaps the reference line. A distance corresponding to an LOS path between the base station and the UE is $d_{LOS}$. An AOA corresponding to the LOS path is $\hat{\theta}_{LOS}$ (an included angle between the normal line of the base station and $d_{LOS}$, namely, an angle formed by rotating the normal line of the base station counterclockwise to $d_{LOS}$). An angle formed by rotating the reference line counterclockwise to $d_{LOS}$ is $\theta_{LOS}$, where $\theta_{LOS}=\hat{\theta}_{LOS}+\varphi$. A distance corresponding to a propagation path (namely, an NLOS path) in which an electromagnetic wave sent by the UE is reflected by the reflection panel and arrives at the base station is $d_{1,NLOS}+d_{2,NLOS}$. An AOA corresponding to the NLOS path is $\hat{\theta}_{LOS}$ (an included angle between the normal line of the base station and $d_{2,NLOS}$, namely, an angle formed by rotating the normal line of the base station counterclockwise to $d_{2,NLOS}$). An angle formed by rotating the reference line counterclockwise to $d_{2,NLOS}$ is $\theta_{NLOS}$, where $\theta_{NLOS}=\hat{\theta}_{NLOS}+\varphi$. An included angle between a reflection path ($d_{2,NLOS}$) and the reflective surface is $\alpha$. Coordinates $$(x'_B, y'_B)$$

of a virtual base station (vNB) are symmetrical to the coordinates $(x_B, y_B)$ of the base station (gNB) on the other side of the reflective surface. To be specific, the vNB and the gNB are in symmetry along an axis of the reflector or mirror symmetry, where the reflective surface (Reflector) is considered as a mirror. In a high-frequency system, the base station and the UE send/receive a signal by using a plurality of beams that are represented by different ellipses in the figure.

The following describes three positioning or calibration methods.

Method 1: UE Location Calculation

In response to a location center already knowing the orientation rotation angle $\varphi$ of the base station, the rotation angle $\delta$ of the reflective surface, the coordinates $(x_B, y_B)$ of the base station, and the coordinates $(x_R, y_R)$ of the reflection panel, because the LOS path being blocked, and $d_{LOS}$ not being able to be measured, the location center obtains a measurement result corresponding to an NLOS path of the reflection panel: RTT and AOA, where $RTT=(d_{1,NLOS}+d_{2,NLOS})/c$, $AOA=\hat{\theta}_{NLOS}$, and c is a speed of light. A location of UE is accurately determined by using the following method.

According to the mirror formula, mirror coordinates of the base station is represented as follows:

$$\begin{bmatrix} x'_B \\ y'_B \end{bmatrix} = \begin{bmatrix} x_B \\ y_B \end{bmatrix} + 2\begin{bmatrix} -\sin\delta\sin\delta & -\cos\delta\sin\delta \\ \cos\delta\sin\delta & \cos\delta\cos\delta \end{bmatrix}\begin{bmatrix} x_R - x_B \\ y_R - y_B \end{bmatrix} \quad (1)$$

The location of the UE is calculated by using the following formula.

$$\begin{bmatrix} x_{UE} \\ y_{UE} \end{bmatrix} = \begin{bmatrix} x'_B + (d_{1,NLOS} + d_{2,NLOS})\cos(\hat{\theta}_{NLOS} + \varphi) \\ y'_B - (d_{1,NLOS} + d_{2,NLOS})\sin(\hat{\theta}_{NLOS} + \varphi) \end{bmatrix} \quad (2)$$

In the foregoing method, the reflection panel is used, so that even in response to the LOS path not being able to be measured, the location of the UE is still accurately determined by obtaining only the measurement values (AOA and RTT) of the NLOS path of the reflection panel. The AOA is obtained by the base station through measurement. The RTT is a sum of receive-transmit time differences that are respectively measured by the base station and the UE and that correspond to the NLOS path of the reflection panel. In some cases, for example, in response to the UE not supporting measurement and reporting, the receive-transmit time difference measured by the UE is ignored, and only the receive-transmit time difference that is of the NLOS path and that is measured by the base station is used as the RTT for positioning calculation. In this case, positioning precision is reduced to some extent.

In response to the base station and the reflection panel being installed correctly or the installation error being small, the orientation rotation angle φ of the base station is 0, and the rotation angle δ of the reflective surface is also 0. In this case, either or both of the values is ignored during the calculation.

Method 2: Orientation Correction of the Reflection Panel and the Base Station In response to the location center already knowing the coordinates ($x_B$, $y_B$) of the base station and the coordinates ($x_R$, $y_R$) of the reflection panel, and obtaining the measurement result corresponding to the LOS path and the measurement result corresponding to the NLOS path of the reflection panel, where the measurement result includes: the receive-transmit time differences: $d_{LOS}/c$ and $(d_{1,NLOS}+d_{2,NLOS})/c$ respectively corresponding to the LOS path and the NLOS path of the reflection panel, and AOAs: $\hat{\theta}_{LOS}$ and $\hat{\theta}_{NLOS}$ that are measured by the base station and that respectively correspond to the LOS path and the NLOS path of the reflection panel.

According to the Law of Cosines:

$$\cos\theta = \frac{d_{2,NLOS}^2 + d_{LOS}^2 - d_{1,NLOS}^2}{2d_{LOS}d_{2,NLOS}} \quad (3)$$

An Included Angle Between the LOS and NLOS is as Follows:

$$\theta = \hat{\theta}_{NLOS} + \varphi - (\hat{\theta}_{LOS} + \varphi) = \theta_{NLOS} - \theta_{LOS} \quad (4)$$

Given $d_{LOS}$, θ, $d_{NLOS}=d_{1,NLOS}+d_{2,NLOS}$, the Following can be Obtained:

$$d_{2,NLOS} = \frac{d_{LOS}^2 - d_{NLOS}^2}{2d_{LOS}\cos\theta - 2d_{NLOS}} \quad (5)$$

An included angle between the reflective surface and the NLOS path is obtained by using the law of cosines:

$$\alpha = \frac{\pi}{2} - \frac{1}{2}\arccos\left(\frac{d_{2,NLOS}^2 + d_{1,NLOS}^2 - d_{LOS}^2}{2d_{1,,NLOS}d_{2,NLOS}}\right) \quad (6)$$

Coordinates of a reflection point is represented as ($x_B + d_{2,NLOS}\cos(\hat{\theta}_{NLOS}+\varphi)$, $y_B + d_{2,NLOS}\sin(\hat{\theta}_{NLOS}+\varphi)$), and the rotation angle δ of the reflection panel is represented as follows:

$$\tan\delta = \frac{x_R - (x_B + d_{2,NLOS}\cos(\hat{\theta}_{NLOS} + \varphi))}{y_R - (y_B + d_{2,NLOS}\sin(\hat{\theta}_{NLOS} + \varphi))} \quad (7)$$

According to an Axiom that Alternate Interior Angles are Equal, the Following is Obtained:

$$\hat{\theta}_{NLOS} + \varphi = \alpha + \delta \quad (8)$$

An orientation error φ of the base station and an orientation error δ of the reflection panel, namely, the steering angle of the base station and the steering angle of the reflection panel, is obtained by combining the two formulas (5) and (6).

In the foregoing calculation, the measurement results (AOA and RTT) respectively corresponding to the LOS path and the NLOS path of the reflection panel is to be obtained. The AOA is measured by the base station. The RTT is the receive-transmit time differences that are measured by the base station and that respectively correspond to the LOS path and the NLOS path of the reflection panel, or is a sum of the receive-transmit time differences that are respectively measured by the base station and the UE and that correspond to the LOS path, or a sum of the receive-transmit time differences that are respectively measured by the base station and the UE and that correspond to the NLOS path of the reflection panel. In some cases, for example, the UE does not support measurement and reporting, the receive-transmit time difference measured by the UE is ignored, and only the receive-transmit time differences that are measured by the base station and that correspond to the LOS path and the NLOS path of the reflection panel are used as the RTT for calibration calculation. In this case, the precision is reduced to some extent.

The calculated orientation error φ of the base station and the orientation error δ of the reflection panel are the orientation rotation angle of the base station and the rotation angle of the reflection panel. Further, the obtained orientation rotation angle of the base station and the rotation angle of the reflection panel are introduced into Method 1, and the location of the UE is calculated according to Method 1.

Method 3: Joint Solution of a Location of the UE, an Orientation of the Base Station, and an Orientation of the Reflection Panel The location center already knows the coordinates ($x_B$, $y_B$) of the base station and the coordinates ($x_R$, $y_R$) of the reflection panel, and obtains the measurement results respectively corresponding to the LOS path and the NLOS path of the reflection panel, where the measurement results include: the receive-transmit time differences: $d_{LOS}/c$ and $(d_{1,NLOS}+d_{2,NLOS})/c$ respectively corresponding to the LOS path and the NLOS path of the reflection panel, and the AOAs: $\hat{\theta}_{LOS}$ and $\hat{\theta}_{NLOS}$ that are measured by the base station and that respectively correspond to the LOS path and the NLOS path of the reflection panel.

In this Case, Mirror Coordinates of the UE is Represented as Follows:

$$\begin{bmatrix} x'_{UE} \\ y'_{UE} \end{bmatrix} = \begin{bmatrix} x_{UE} \\ y_{UE} \end{bmatrix} + 2\begin{bmatrix} \sin\theta\sin\theta & -\cos\theta\sin\theta \\ -\cos\theta\sin\theta & \cos\theta\cos\theta \end{bmatrix}\begin{bmatrix} x_R - x_{UE} \\ y_R - y_{UE} \end{bmatrix} \tag{9}$$

A relationship between a mirror location of the UE and a location of the base station is represented as follows:

$$\begin{bmatrix} x'_{UE} \\ y'_{UE} \end{bmatrix} = \begin{bmatrix} x_B + (d_{1,NLOS} + d_{2,NLOS})\cos(\hat{\theta}_{NLOS} + \varphi) \\ y_B + (d_{1,NLOS} + d_{2,NLOS})\sin(\hat{\theta}_{NLOS} + \varphi) \end{bmatrix} \tag{10}$$

The Location of the UE is Represented as Follows:

$$\begin{bmatrix} x_{UE} \\ y_{UE} \end{bmatrix} = \begin{bmatrix} x_B + d_{NLOS}\cos(\hat{\theta}_{LOS} + \varphi) \\ y_B - d_{NLOS}\sin(\hat{\theta}_{LOS} + \varphi) \end{bmatrix} \tag{11}$$

The Following is Obtained:

$$\begin{cases} x_{UE} + 2\sin\delta(\sin\delta - \cos\delta)(x_R - x_{UE}) - x_B - (d_{1,NLOS} + d_{2,NLOS})\cos(\hat{\theta}_{NLOS} + \varphi) = 0 \\ y_{UE} + 2\cos\delta(-\sin\delta + \cos\delta)(y_R - y_{UE}) - y_{UE} - (d_{1,NLOS} + d_{2,NLOS})\sin(\hat{\theta}_{NLOS} + \varphi) = 0 \\ x_B + d_{NLOS}\cos(\hat{\theta}_{LOS} + \varphi) - x_{UE} = 0 \\ y_B - d_{NLOS}\sin(\hat{\theta}_{LOS} + \varphi) - y_{UE} = 0 \end{cases} \tag{12}$$

Coordinates ($x_{UE}$, $y_{UE}$) of the UE, the orientation error $\varphi$ of the base station, and the orientation error $\delta$ of the reflection panel is obtained by combining the foregoing formulas 9 to 11.

In the foregoing calculation, the measurement results (AOA and RTT) respectively corresponding to the LOS path and the NLOS path of the reflection panel is to be obtained. The AOA is measured by the base station. The RTT is the receive-transmit time differences that are measured by the base station and that respectively correspond to the LOS path and the NLOS path of the reflection panel, or is a sum of the receive-transmit time differences that are respectively measured by the base station and the UE and that correspond to the LOS path, or a sum of the receive-transmit time differences that are respectively measured by the base station and the UE and that correspond to the NLOS path of the reflection panel. In some cases, for example, the UE does not support measurement and reporting, the receive-transmit time difference measured by the UE is ignored, and only the receive-transmit time differences that are measured by the base station and that correspond to the LOS path and the NLOS path of the reflection panel are used as the RTT for positioning and calibration calculation. In this case, the precision is reduced to some extent.

Figure 8:
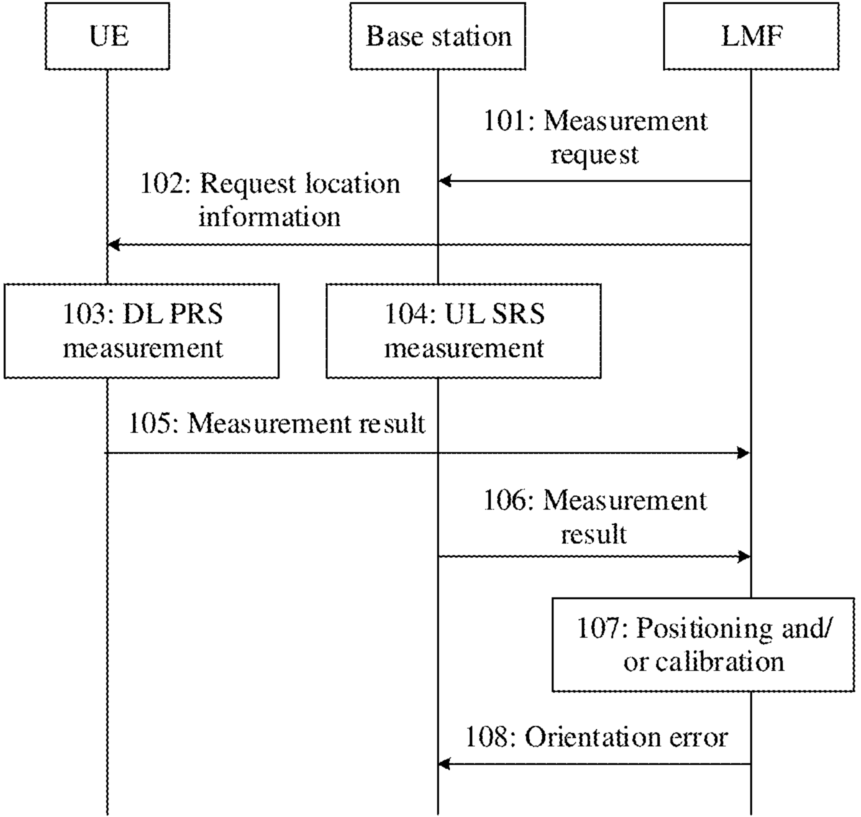
FIG. 8 is a schematic flowchart of a positioning method according to at least one embodiment.

The following describes a positioning or calibration method provided in at least one embodiment with reference to FIG. 8. A location center is an LMF. An access network element is a base station, and the base station is an eNB, a gNB, a TRP, or the like. A terminal device is UE. The method includes the following steps:

101: The LMF sends a measurement request to the base station.

The measurement request is sent by using the NRPPa. For example, the measurement request is an NRPPa measurement request, and includes one or more of the following content:

Station identifier: used to indicate a station that participates in measurement, and is one or more of a TRP ID, a PCI (physical cell identifier), a CGI (cell global identity, cell global identity), or the like. The station herein is a gNB, or is a TRP.

Measurement type: used to indicate a type of measurement performed by the gNB, for example, gNB-RxTx or UL-AOA. In response to the indicated type being gNB-RxTx, the gNB measures a signal receive-transmit time difference. In response to the indicated type being UL-AOA, the gNB measures an uplink angle-of-arrival. In response to a plurality of types being indicated, the gNB performs a plurality of types of measurement.

First indication information: indicating the base station to measure a reflection path (namely, an NLOS path) of a reflection panel. The indication information is information about the reflection panel, for example, location range information of the reflection panel. The location range information is a direction or a direction range of the reflection panel relative to the base station, or is a specific location or location range of the reflection panel, for example, coordinates of the reflection panel and a quadrant in which the reflection panel is located. The base station determines the direction or the direction range of the reflection panel based on the specific location or location range of the reflection panel. In this case, the base station measures a reference signal in the corresponding direction or direction range based on the first indication information. During specific implementation, the base station expands the corresponding direction or direction range to some extent and use the corresponding direction or direction range as a measurement range, to help detect a signal reflected by the reflection panel.

Alternatively, the first indication information is measurement range information that indicates a measurement range of the base station. In response to the reflection panel being located in the range, or the signal reflected by the reflection panel being located in the range, the base station measures the signal reflected by the reflection panel, to obtain a measurement result corresponding to the NLOS path.

The LMF already knows a location of the gNB, the reflection panel is manually installed, and the location of the reflection panel is also stored in the LMF. Therefore, the LMF determines the location or direction (or the location range or direction range) of the reflection panel relative to the base station, and store the location or direction in the LMF.

For Example, the First Indication Information Includes One or More of the Following:

an azimuth angle value or a horizontal angle value, for example, an included angle between a projection of the reflection panel on a horizontal plane in a direction relative to the base station or TRP and a due north direction under a GCS, or an included angle between a direction of the reflection panel relative to the base station or TRP and a due north direction under a GCS;

a zenith angle value or a vertical angle value, for example, an included angle between a direction of the reflection panel relative to the base station or TRP and a zenith direction under a GCS;

an azimuth angle or horizontal angle range, or an angle range determined based on an uncertain value and an azimuth angle value, where the uncertain value is preset, for example, the azimuth angle value is added or subtracted by 15 degrees as a measurement angle range;

a zenith angle or vertical angle range, or an angle range determined based on an uncertain value and a zenith angle value, where the uncertain value is preset, for example, an zenith angle value is added or subtracted by 15 degrees as a measurement angle range;

an angle range value, which is a value corresponding to a preset angle range in response to angle ranges being numbered in a predetermined manner, for example, a quadrant number; and a specific location of the reflection panel, for example, coordinates of the reflection panel under the GCS or LCS.

The first indication information mentioned above is carried in the measurement request. Alternatively, the first indication information is not carried in the measurement request, and is indication information that is separately sent.

102: The LMF sends location request information, which is also referred to as request location information, to the UE, for example, LPP/NRPP/NPP request location information, where the location request information includes one or more of the following content:

third indication information, indicating a resource ID corresponding to a measured reference signal reported by the UE, where the resource ID corresponds to a transmit beam of the PRS, and based on the third indication information, the reported measurement result of the UE includes beam information corresponding to the measured reference signal, for example, the resource ID; and multipath measurement indication, indicating the UE to measure a plurality of paths.

103: The UE measures the PRS sent by the base station, to obtain a measurement result.

The base station herein is a gNB, an eNB, or a TRP. The measurement result includes a UE receive-transmit time difference (UE-RxTx TD) measured by the terminal device, that is, a receive-transmit time difference measured by the UE. The UE measures a plurality of paths, and each path corresponds to one measurement result.

104: The base station measures an SRS sent by the UE, to obtain a measurement result.

According to the measurement type in 101, the base station performs corresponding measurement. The measurement result includes a UE receive-transmit time difference (gNB-RxTx TD) and/or a UL-AOA measured by the base station, that is, a receive-transmit time difference and an uplink angle-of-arrival that are measured by the base station. The base station measures a plurality of paths, and each path corresponds to a set of measurement results.

105: The UE reports the measurement result to the LMF. For example, the measurement result is carried in LPP/NRPP/NPP provide location information. The measurement result includes a plurality of measurement results, for example, a measurement result corresponding to an NLOS path and a measurement result corresponding to an LOS path, or includes only one of the measurement results. Each measurement result includes one or more of the following:

a station identifier: including one or more of a PRS ID, a PCI, and a CGI, and indicating a base station or TRP corresponding to the measurement result;

fourth indication information, indicating beam information corresponding to a measurement result, for example, a resource ID and/or a resource set ID of a PRS, where the resource ID corresponds to a transmit beam of the base station, and the resource set ID corresponds to an antenna panel of the base station, and in response to a plurality of measurement results being reported, each result is matched with a resource ID and/or resource set ID of a corresponding PRS; and measurement result content: UE-RxTx TD, indicating a receive-transmit time difference measured by the UE.

106: The base station reports the measurement result to the LMF. The measurement result is carried in a measurement response, for example, in an NRPPa measurement response. The measurement result includes a plurality of measurement results, for example, a measurement result corresponding to an NLOS path and a measurement result corresponding to an LOS path, or includes only one of the measurement results. Each measurement result includes one or more of the following:

a station identifier: including one or more of a TRP ID, a CGI, and a PCI, and indicating a station or TRP corresponding to the measurement result;

measurement result content: gNB-RxTx TD and/or UL-AOA, where each path corresponds to a set of measurement result content; and second indication information, which is information about the reflection panel, and indicates that the measurement result is obtained by measuring the NLOS path corresponding to the reflection panel, or indicates that the measurement result is a measurement result obtained through measurement based on the first indication information. The second indication information is a measurement range identifier, indicating that the measurement result is obtained by measurement based on the location range or the direction range that is of the reflection panel and that is indicated by the first indication information in 101. At least one set of measurement results has a measurement range identifier, indicating that the measurement result is a measurement result obtained by measuring the NLOS path of the reflection panel.

Content of the second indication information is also consistent with that of the first indication information. Alternatively, a simple bit is used to indicate whether the measurement result is a measurement result obtained through measurement based on the first indication information. In response to a value of the bit being 1, the measurement result is a measurement result obtained through measurement based on the first indication information; in response to a value of the bit being indicated to be 0, the measurement result is not a measurement result obtained through measurement based on the first indication information; and vice versa. A plurality of bits is also used for indication.

The measurement result including the second indication information is a measurement result corresponding to the NLOS path of the reflection panel. The second indication information is included in the measurement result or the measurement response, or is sent separately, to indicate that a specific measurement result is a measurement result corresponding to the NLOS path of the reflection panel.

107: The LMF determines the location of the UE based on the measurement results received from the base station and the UE, or corrects an orientation of the reflection panel and/or the base station, that is, determines a steering angle of the reflection panel and/or the base station, and further determines the location of the UE. Alternatively, the LMF determines the steering angle of the reflection panel and/or the base station and the location of the UE at the same time.

In the foregoing procedure, communication between the LMF, the gNB, and the UE complies with the network architecture shown in FIG. 2. For example, the LMF communicates with the gNB by using an AMF, and the LMF communicates with the UE by using the AMF and the gNB. The Measurement Result Obtained by the LMF Includes One or More of the Following:

measurement results that are of one or more paths and that are measured by the UE, where each measurement result includes: a UE-RxTx TD and a resource ID and/or a resource set ID of a corresponding PRS, and further includes a station identifier;

a measurement result that corresponds to an earliest arrival path and that is measured by the gNB: a gNB-RxTx TD and/or a UL-AOA, where the measurement result further includes a station identifier; and a measurement result that is measured by the gNB and that carries reflection panel indication information: a gNB-RxTx TD and/or a UL-AOA, indicating that the measurement result is a measurement result obtained by measuring the NLOS path of the reflection panel, where the measurement result further includes a station identifier.

On a UE side, because a resource ID of a PRS corresponds to a transmit beam of the PRS, directions of transmit beams are different. The LMF selects a measurement result corresponding to a resource ID in a direction toward the reflection panel as a measurement result corresponding to a propagation path reflected by the reflection panel (namely, an NLOS path, or referred to as a reflection path), and denote the measurement result as UE-RxTx TD_NLOS. In response to there being at least one UE-RxTx TD smaller than the UE-RxTx TD_NLOS, a measurement result with a smallest UE-RxTx TD is used as a measurement result of an LOS path, and is denoted as UE-RxTx TD_LOS. In some cases, there is no measurement result of the LOS path because the LOS path is blocked.

On a gNB side, the measurement result with the second indication information is considered as a measurement result corresponding to a propagation path reflected by the reflection panel (namely, an NLOS path, or referred to as a reflection path), and is denoted as gNB-RxTx TD_NLOS and UL-AOA_NLOS. In response to there being at least one set of measurement results in which the gNB-RxTx TD is smaller than the gNB-RxTx TD_NLOS, a set of measurement results with a smallest gNB-RxTx TD is used as a measurement result of the LOS path, and is denoted as gNB-RxTx TD_LOS and UL-AOA_LOS. In some cases, there is no measurement result of the LOS path because the LOS path is blocked.

An RTT between the UE and the gNB is as follows: gNB-RxTx TD+UE-RxTx TD. An RTT corresponding to the LOS path is as follows: RTT_LOS=gNB-RxTx TD_LOS+UE-RxTx TD_LOS, and an RTT corresponding to the NLOS path of the reflection panel is as follows: RTT_NLOS=gNB-RxTx TD_NLOS+UE-RxTx TD_NLOS. In addition, a measurement result of the UE is alternatively ignored, and the gNB-RxTx TD is directly used as the RTT between the UE and the gNB. In this case, an RTT corresponding to the LOS path is as follows: RTT_LOS=gNB-RxTx TD_LOS, and an RTT corresponding to the NLOS path of the reflection panel is as follows: RTT_NLOS=gNB-RxTx TD_NLOS.

RTT_NLOS=$(d_{1,NLOS}+d_{2,NLOS})/c$, UL-AOA_NLOS=$\hat{\theta}_{NLOS}$, RTT_NLOS=$d_{LOS}/c$, and UL-AOA_LOS=$\hat{\theta}_{LOS}$. The location of the UE, the orientation error $\varphi$ of the base station, and the orientation error $\delta$ of the reflection panel is obtained through calculation by substituting into the foregoing formula of Method 1, Method 2, or Method 3.

For example, in response to the LMF already knowing the orientation rotation angle $\varphi$ of the base station, the rotation angle $\delta$ of the reflective surface, the coordinates $(x_B, y_B)$ of the base station, and the coordinates $(x_R, y_R)$ of the reflection panel, because the LOS path is blocked and cannot be measured, the LMF obtains the measurement results that are measured by the base station and the UE and that correspond to the NLOS path of the reflection panel, and then the location of the UE is obtained according to the calculation method mentioned in Method 1.

In response to the LMF already knowing the coordinates $(x_B, y_B)$ of the base station, the coordinates $(x_R, y_R)$ of the reflection panel, and the LOS path not being blocked and being measured, the LMF obtains the measurement result that corresponds to the NLOS path and that is measured by the base station: gNB-RxTx TD_NLOS and UL-AOA_NLOS, and also obtains the measurement result that corresponds to the LOS path and that is measured by the base station: gNB-RxTx TD_LOS and UL-AOA_LOS, and then the orientation rotation angle $\varphi$ of the base station and the rotation angle $\delta$ of the reflective surface, namely, the orientation error of the base station and the orientation error of the reflection panel, is obtained according to the calculation method mentioned in Method 2. In this case, the orientation of the base station and the orientation of the reflection panel is calibrated based on a calculation result. Further, the location of the UE is also obtained according to the calculation method in Method 1. In addition, the orientation rotation angle $\varphi$ of the base station, the rotation angle $\delta$ of the reflective surface, and the location of the UE is also directly obtained according to Method 3.

In the foregoing process, in response to the UE not supporting measurement and reporting of a reference signal, 102 and 105 is omitted, and the LMF positions the UE only based on a measurement result of the base station.

108: The LMF sends the measured orientation error information back to the base station.

The LMF sends the calculated orientation error $\varphi$ of the base station and/or the orientation error $\delta$ of the reflection panel to the base station. The base station calibrates the errors, or notifies a terminal device such as a mobile phone of maintenance personnel of the error information, for example, to send the error information to the mobile phone of the calibration personnel by using an SMS message, so that the maintenance personnel manually calibrate the orientation error of the base station and/or the reflection panel.

Optionally, the base station notifies maintenance personnel closest to the base station or the reflection panel of the error information, to facilitate timely maintenance or calibration.

The error information is sent to the gNB by using the NRPPa, or is sent by using a transmission reception point information request (TRP information request) or a measurement request (Measurement request). The method for calculating the orientations of the base station and the reflection panel by the LMF is described in detail above.

In another embodiment, the base station stores a correspondence between an identifier of a reflection panel and location range information or direction range information, and the first indication information is alternatively the identifier of the reflection panel. A network device determines a location or a location range of the reflection panel (or determine a direction or a direction range of the reflection panel) based on the correspondence and the first indication information, and then measures a reference signal at the location or in the location range (or in the direction or the direction range). Alternatively, the location or the location range (or the direction or the direction range) is expanded to some extent and used as a measurement range. In this case, the second indication information is measurement range information, or is information about the reflection panel, for example, the identifier of the reflection panel, the location or the location range of the reflection panel, and the direction or the direction range of the reflection panel, and indicates that the measurement result is a measurement result corresponding to a reflection path (namely, an NLOS path) of the reflection panel. A specific procedure is similar to that in the embodiment in FIG. 8, and the method includes the following steps:

101: An LMF sends a measurement request to a base station.

The measurement request includes first indication information. The first indication information is identifier information of a reflection panel, or the first indication information includes an identifier of the reflection panel; and in another case, the first indication information is separately sent, and is not carried in the measurement request.

Other content is similar to that in the foregoing embodiment. Details are not described again.

102 and 103 are similar to those in the foregoing embodiment. Details are not described again.

The LMF delivers request location information to UE. The UE measures a PRS delivered by the base station, and reports a measurement result. The process is similar to that in the foregoing embodiment. Details are not described again.

104: The base station measures an SRS sent by the UE, to obtain a measurement result.

The base station stores a correspondence between an identifier of a reflection panel and a location or a location range of the reflection panel. Because the measurement request in 101 includes an identifier of the reflection panel, the base station determines a location or a location range of the reflection panel based on the received identifier of the reflection panel and the correspondence, to measure an SRS at the corresponding location or in the corresponding location range. Alternatively, the location or the location range is first converted into a direction or a direction range of the reflection panel relative to the base station, and then an SRS in the direction or the direction range is measured.

Alternatively, the base station stores a correspondence between an identifier of a reflection panel and a direction or a direction range of the reflection panel. Because the measurement request in 101 includes an identifier of the reflection panel, the base station determines a direction or a direction range of the reflection panel based on the received identifier of the reflection panel and the correspondence, to measure an SRS in the corresponding direction or direction range.

There is one or more reflection panels. In response to there are a plurality of reflection panels, the method is applicable to a more complex positioning environment, and a positioning range of the UE is expanded.

105: The UE reports the measurement result to the LMF.

Measurement and reporting of the UE are similar to those in the foregoing embodiment. Details are not described again.

106: The base station reports the measurement result to the LMF. The measurement result is carried in a measurement response, for example, in an NRPPa measurement response. The measurement result includes a plurality of measurement results, for example, a measurement result corresponding to an NLOS path and a measurement result corresponding to an LOS path, or includes only one of the measurement results. For content of the measurement result, refer to the foregoing embodiment.

In response to a measurement result including second indication information, the measurement result is a measurement result obtained through measurement based on the first indication information, that is, the measurement result is obtained by measuring an NLOS path corresponding to the reflection panel indicated by the first indication information. The second indication information is information about the reflection panel, for example, identifier information of the reflection panel, or an identifier indicating the reflection panel.

The second indication information is also similar to that in the foregoing embodiment, for example, indicating a location or a location range of the reflection panel, or indicating a direction or a direction range of the reflection panel. The second indication information is alternatively a measurement range identifier, and indicates a measurement range of the measurement result. Alternatively, indication is performed by using a bit. For details, refer to the foregoing embodiment.

For example, in response to a measurement result reported by the base station including second indication information, for example, an identifier of a reflection panel, the LMF determines, based on the identifier of the reflection panel, which reflection panel is measured to obtain the measurement result, and then positions the terminal device with reference to location information of the reflection panel. Further, the reflection panel and the base station is calibrated. The positioning and calibration method is described in the foregoing embodiment. Details are not described herein again.

The LMF stores a correspondence between identifier information of a reflection panel and location information of the reflection panel, to determine location information of a reflection panel based on identifier information of the reflection panel.

In response to the second indication information included in a measurement result indicating a location or a location range of a reflection panel, or indicating a direction or a direction range of a reflection panel, the LMF determines an NLOS path of which reflection panel is measured to obtain the measurement result because the LMF stores location information of each reflection panel, and then positions the terminal device with reference to the location information of the reflection panel. Further, the reflection panel and the base station is calibrated. The positioning and calibration method is described in the foregoing embodiment. Details are not described herein again.

In response to the second indication information included in a measurement result including a measurement range identifier, the LMF determines, based on the measurement range identifier, a reflection panel located in the measurement range, to determine that the measurement result is a measurement result corresponding to an NLOS path of the reflection panel, and then positions the terminal device with reference to location information of the reflection panel. Further, the reflection panel and the base station is calibrated. The positioning and calibration method is described in the foregoing embodiment. Details are not described herein again.

Other content of the process is similar to that in the foregoing embodiment. Details are not described again.

107: The positioning and calibration method is similar to that in the foregoing embodiment. Details are not described again.

108: The LMF sends measured orientation error information back to the base station.

In response to the LMF sending a calculated orientation error $\varphi$ of the base station and/or an orientation error $\delta$ of the reflection panel to the base station, the information about the reflection panel is carried, for example: the identifier of the reflection panel, the location or the location range of the reflection panel, or the direction or the direction range of the reflection panel. Because a plurality of reflection panels is installed, the base station knows which reflection panel is to be calibrated or maintained, and then send the error information to a mobile phone of corresponding calibration personnel. The error information also carries the information about the reflection panel (the identifier of the reflection panel, the location or the location range of the reflection panel, or the direction or the direction range of the reflection panel), so that the maintenance personnel calibrates the corresponding reflection panel.

Optionally, the base station notifies maintenance personnel closest to the base station or the reflection panel of the error information, to facilitate timely maintenance or calibration.

Other content is similar to that in the foregoing embodiment. Details are not described again.

The foregoing embodiment is applicable to a scenario in which a single reflection panel is installed, and is also applicable to a scenario in which a plurality of reflection panels are installed. In response to a plurality of reflection panels being installed, the foregoing embodiment adapts to a more complex scenario, and a positioning range of the UE is expanded. In addition, because the first indication information and the second indication information is the identifier information of the reflection panel, for example, is a number of the reflection panel, compared with the first embodiment, signaling overheads are reduced.

The foregoing mainly describes the positioning and calibration solutions provided in at least one embodiment from a perspective of interaction between devices. To implement the foregoing functions, the devices include hardware structures and/or software modules corresponding to the functions. A person of ordinary skill in the art should easily be aware that, with reference to algorithm steps in the examples described in embodiments disclosed herein, at least one embodiment is implemented by hardware or a combination of hardware and computer software. Whether a function is performed by hardware or hardware driven by computer software depends on particular applications and design constraints of the technical solutions. A person skilled in the art uses different methods to implement the described functions for each particular application, but the implementation is not considered to go beyond the scope of embodiments described herein.

In at least one embodiment, each device is divided into functional modules based on the foregoing method examples. For example, each functional module is obtained through division based on each corresponding function, or two or more functions is integrated into one processing module. The integrated module is implemented in a form of hardware, or is implemented in a form of a software functional module. In at least one embodiment, division into the modules is an example and is merely logical function division. During actual implementation, another division manner is used.

Figure 9:
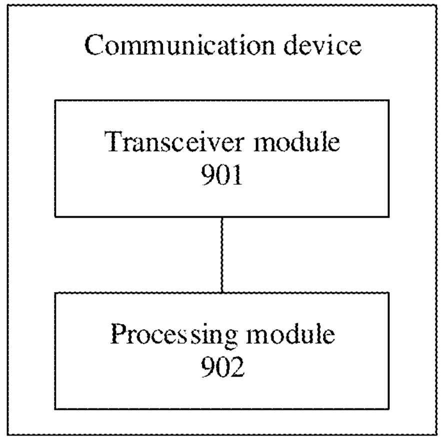
FIG. 9 is a schematic diagram of composition of a communication device according to at least one embodiment.

In response to each functional module being obtained through division based on each corresponding function, FIG. 9 shows a communication device. The communication device includes a transceiver module 901 and a processing module 902. For example, the communication device is a location management network element, a network device, or a terminal device, or is a chip in a location management network element, a network device, or a terminal device, or another combined device or component that has the functions of the communication device. In response to the communication device being a location management network element, a network device, or a terminal device, the transceiver module 901 is a transceiver, and the transceiver includes an antenna, a radio frequency circuit, and the like; and the processing module 902 is a processor (or a processing circuit), for example, a baseband processor, and the baseband processor includes one or more CPUs. In response to the communication device being a device or component having the foregoing functions, the transceiver module 901 is a radio frequency unit; and the processing module 902 is a processor (or a processing circuit), for example, a baseband processor. In response to the communication device being a chip system, the transceiver module 901 is an input/output interface of a chip (for example, a baseband chip); and the processing module 902 is a processor (or a processing circuit) of the chip system, and includes one or more central processing units. The transceiver module 901 in at least one embodiment is implemented by a transceiver or a transceiver-related circuit assembly; and the processing module 902 is implemented by a processor or a processor-related circuit assembly (or referred to as a processing circuit).

For example, in response to the communication device being a location management network element or a chip or a functional unit of a location management network element, the transceiver module 901 is configured to perform all sending and receiving operations performed by the LMF in the embodiment shown in FIG. 8, and/or configured to support another process of the technology described in embodiments herein; and the processing module 902 is configured to perform all operations performed by the LMF in the embodiment shown in FIG. 8 except the sending and receiving operations, and/or configured to support another process of the technology described in at least one embodiment.

The transceiver module 901 includes a sending module and/or a receiving module, respectively configured to perform the sending and receiving operations performed by the LMF in the embodiment shown in FIG. 8. For example, the communication device includes:

a sending module, configured to send first indication information to a network device, where the first indication information is useable by the network device to measure a non-line-of-sight (NLOS) path of a reflection panel, that is, is useable by the network device to measure a signal that is sent by a terminal device and that is reflected by the reflection panel;

a receiving module, configured to receive a measurement result of the network device, where the measurement result includes a receive-transmit time difference and an uplink angle-of-arrival that are obtained by the network device by measuring the NLOS path of the reflection panel, and measuring the NLOS path of the reflection panel is measuring a signal reflected by the reflection panel; and a processing module, configured to determine a location of the terminal device based on location information of the network device, location information of the reflection panel, and the measurement result.

With reference to the foregoing solution, the receiving module is further configured to receive a measurement result of the terminal device, where the measurement result includes a receive-transmit time difference obtained by the terminal device by measuring the NLOS path of the reflection panel; and the processing module is specifically configured to determine the location of the terminal device based on the location information of the network device, the location information of the reflection panel, the measurement result of the terminal device, and the measurement result of the network device.

In Another Example, the Communication Device Includes:

a sending module, configured to send first indication information to a network device, where the first indication information is useable by the network device to measure a non-line-of-sight (NLOS) path of a reflection panel, that is, is useable by the network device to measure a signal that is sent by a terminal device and that is reflected by the reflection panel;

a receiving module, configured to receive a measurement result of the network device, where the measurement result includes a receive-transmit time difference and an uplink angle-of-arrival that are obtained by the network device by measuring the NLOS path of the reflection panel, and a receive-transmit time difference and an uplink angle-of-arrival that are obtained by the network device by measuring a line-of-sight (LOS) path; and measuring the NLOS path of the reflection panel is measuring a signal reflected by the reflection panel, and measuring the LOS path is measuring a signal sent by the terminal device in the LOS path; and a processing module, configured to determine, based on location information of the network device, location information of the reflection panel, and the measurement result, at least one of the following: a location of the terminal device, a steering angle of the network device, and a steering angle of the reflection panel.

With reference to the foregoing solution, the receiving module is further configured to receive a measurement result of the terminal device. The measurement result includes a receive-transmit time difference obtained by the terminal device by measuring the NLOS path of the reflection panel, and a receive-transmit time difference obtained by measuring the LOS path. To be specific, a signal sent by the network device arrives at the terminal device through the reflection panel, and is measured by the terminal device, and the terminal device reports the measurement result that is received by the receiving module.

The processing module is further configured to determine, based on the location information of the network device, the location information of the reflection panel, the measurement result of the network device, and the measurement result of the terminal device, at least one of the following: the location of the terminal device, the steering angle of the network device, and the steering angle of the reflection panel.

In response to the communication device being a network device or a chip or a functional unit of a network device, the communication device includes:

a receiving module, configured to receive first indication information sent by a location management network element;

a processing module, configured to perform signal measurement based on the first indication information; and a sending module, configured to send a measurement result to the location management network element.

For other functions of the communication device, refer to the description of the network device in the method embodiment. Details are not described again.

In still another possible implementation, the transceiver module 901 in FIG. 9 is replaced with a transceiver, and a function of the transceiver module 901 is integrated into the transceiver; and the processing module 902 is replaced with a processor, and a function of the processing module 902 is integrated into the processor. Further, a location management network element shown in FIG. 9 further includes a memory (not shown in the figure). In response to the transceiver module 901 being replaced with the transceiver, and the processing module 902 being replaced with the processor, the communication device in at least one embodiment is the communication apparatus shown in FIG. 3.

The processor and the transceiver that are described in at least one embodiment is implemented on an integrated circuit (IC), an analog IC, a radio frequency integrated circuit, a mixed-signal IC, an application-specific integrated circuit (ASIC), a printed circuit board (PCB), an electronic device, or the like. The processor and the transceiver is manufactured by using various IC processing technologies, for example, a complementary metal oxide semiconductor (CMOS), an N-metal-oxide-semiconductor (NMOS), a positive channel metal oxide semiconductor (PMOS), a bipolar junction transistor (BJT), a bipolar CMOS (BiCMOS), silicon-germanium (SiGe), and gallium arsenide (GaAs).

The memory is a volatile memory or a nonvolatile memory, or includes both a volatile memory and a nonvolatile memory. The nonvolatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (RAM), and is used as an external cache. By way of example but not limitation, many forms of RAMs is used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory of the systems and methods described in at least one embodiment includes but is not limited to these and any other proper types of memories.

Figure 10:
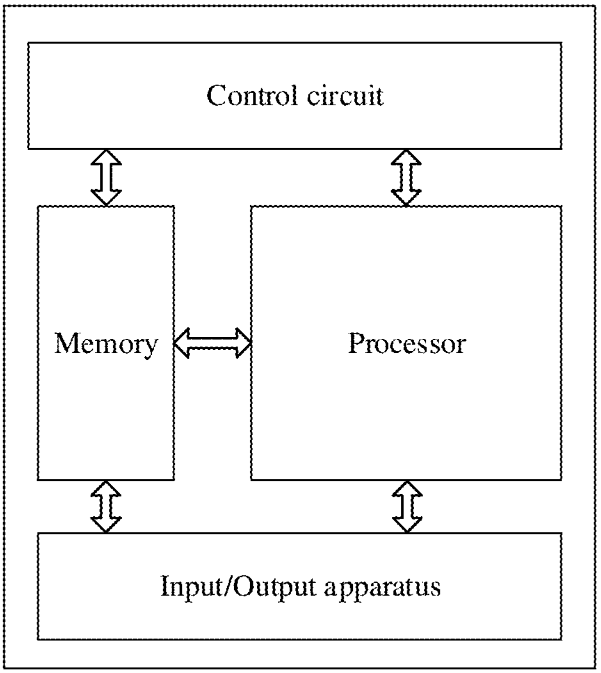
FIG. 10 is a schematic diagram of a structure of another communication device according to at least one embodiment.

FIG. 10 is a schematic diagram of a structure of a communication device. The communication device is applicable to the scenarios shown in the foregoing method embodiments. For ease of description, FIG. 10 shows only main components of the communication device, including a processor, a memory, a control circuit, and an input/output apparatus. The processor is mainly configured to: process a communication protocol and communication data, execute a software program, and process data of the software program. The memory is mainly configured to store a software program and data. The control circuit is mainly configured to: supply power and transmit various electrical signals. The input/output apparatus is mainly configured to: receive data input by a user and output data to the user.

In response to the communication apparatus being a location management network element, the communication apparatus is a computer or a server having a computing function. The control circuit is a mainboard. The memory includes a medium having a storage function, such as a hard disk, a RAM, or a ROM. The processor is a CPU. The input/output apparatus includes a display, a keyboard, a mouse, and the like. The control circuit further includes or be connected to a transceiver circuit or a transceiver, for example, a wireless network adapter or a network cable interface, and is configured to send or receive data or a signal, for example, to perform data transmission and communication with a base station.

In response to the communication apparatus being a network device, for example, a base station, the control circuit is a board. The memory includes a medium having a storage function, such as a hard disk, a RAM, or a ROM. The processor includes a baseband processor and a central processing unit. The baseband processor is mainly configured to process a communication protocol and communication data. The central processing unit is mainly configured to: control the entire network device, execute a software program, and process data of the software program. The input/output apparatus includes a display, a keyboard, a mouse, and the like. The control circuit further includes or be connected to a transceiver circuit or a transceiver, for example, a network cable interface, and is configured to send or receive data or a signal, for example, to perform data transmission and communication with a location management network element. Further, an antenna is further included, configured to receive and send a radio signal, and configured to transmit a signal to a terminal device.

According to the methods described herein, at least one embodiment further provides a computer program product. The computer program product includes computer program code. In response to the computer program code being run on a computer, the computer is enabled to perform the method in the embodiment shown in FIG. 8.

At least one embodiment further provides a computer-readable storage medium. All or some of the procedures in the foregoing method embodiments is implemented by a computer or an apparatus having an information processing capability by executing a computer program or instructions, to control related hardware. The computer program or the set of instructions is stored in the foregoing computer-readable storage medium. In response to the computer program or the set of instructions being executed, the procedures in the foregoing method embodiments is performed. The computer-readable storage medium is an internal storage unit of the terminal device (including a data transmitting end and/or a data receiving end) in any one of the foregoing embodiments, for example, a hard disk or a memory of the terminal device. Alternatively, the computer-readable storage medium is an external storage device of the terminal device, for example, a plug-in hard disk, a smart memory card (SMC), a secure digital (SD) card, a flash card (flash card), or the like that is configured on the terminal device. Further, the computer-readable storage medium alternatively includes both the internal storage unit and the external storage device of the terminal device. The computer-readable storage medium is configured to store the computer program and other programs and data that are used by the terminal device. The computer-readable storage medium is further configured to temporarily store data that has been output or is to be output.

In at least one embodiment, claims, and accompanying drawings, terms such as "first" and "second" are intended to distinguish between different objects but do not indicate a particular order. In addition, terms "include", "have", or any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In at least one embodiment, "at least one (item)" means one or more, "a plurality of" means two or more, "at least two (items)" means two, three, or more, and "and/or" is used to describe an association relationship between associated objects and indicates that three relationships exist. For example, "A and/or B" indicates the following three cases: Only A exists, only B exists, and both A and B exist, where A and B is singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one item (piece) of a, b, or c indicates: a, b, c, "a and b", "a and c", "b and c", or "a, b, and c", where a, b, and c is singular or plural.

The foregoing descriptions of implementations allow a person skilled in the art to clearly understand that, for the purpose of convenient and brief description, division of the foregoing functional modules is used as an example for illustration. During actual application, the foregoing functions is allocated to different functional modules and implemented based on usage, that is, an inner structure of an apparatus is divided into different functional modules to implement all or some of the functions described above.

In at least one embodiment, the disclosed apparatus and method is implemented in other manners. For example, the described apparatus embodiments are merely examples. For example, division into the modules or units is merely logical function division and is other division in actual implementation. For example, a plurality of units or components is combined or integrated into another apparatus, or some features is ignored or not performed. In addition, the displayed or discussed mutual couplings, direct couplings, or communication connections is implemented through some interfaces. Indirect couplings or communication connections between the apparatuses or units is implemented in an electronic form, a mechanical form, or another form.

The units described as separate parts is or is not physically separate, and parts displayed as units is one or more physical units, in other words, is located in one place, or is distributed on different places. Some or all of the units is selected based on an actual usage to achieve objectives of the solutions in embodiments.

In addition, functional units in at least one embodiment are integrated into one processing unit, each of the units exist alone physically, or two or more units are integrated into one unit. The integrated unit is implemented in a form of hardware, or is implemented in a form of a software functional unit.

In response to the integrated unit being implemented in the form of a software functional unit and sold or used as an independent product, the integrated unit is stored in a readable storage medium. Based on such an understanding, the technical solutions of at least one embodiment essentially, or the part contributing to the conventional technology, or all or some of the technical solutions is implemented in the form of a software product. The software product is stored in a storage medium and includes several instructions for instructing a device (which is a single-chip microcomputer, a chip, or the like) or a processor (processor) to perform all or some of the steps of the methods described in at least one embodiment. The foregoing storage medium includes any medium that stores program code, such as a USB flash drive, a removable hard disk, a ROM, a RAM, a magnetic disk, or an optical disc.

The foregoing descriptions are merely specific implementations of at least one embodiment, but are not intended to limit the protection scope of embodiments described herein. Any variation or replacement within the technical scope disclosed herein shall fall within the protection scope at least one embodiment. Therefore, the protection scope of at least one embodiment shall be subject to the protection scope of the claims.

What is claimed is:

1. A positioning method, comprising:

sending, by a location management network element, first indication information to a network device, wherein the first indication information is useable by the network device to measure a signal that is sent by a terminal device and that is reflected by a reflection panel;

receiving, by the location management network element, a measurement result of the network device, wherein the measurement result includes a receive-transmit time difference and an uplink angle-of-arrival that are obtained by the network device by measuring the signal that is sent by the terminal device and that is reflected by the reflection panel; and determining, by the location management network element, a location of the terminal device based on coordinates and steering angle of the network device, coordinates and steering angle of the reflection panel, and the measurement result.

2. The method according to claim 1, further comprising:

receiving, by the location management network element, a measurement result of the terminal device, wherein the measurement result includes a receive-transmit time difference obtained by the terminal device by measuring a signal that is sent by the network device and that is reflected by the reflection panel; and the determining, by the location management network element, a location of the terminal device based on the coordinates and steering angle of the network device, the coordinates and steering angle of the reflection panel, and the measurement result includes:

determining, by the location management network element, the location of the terminal device based on the coordinates and steering angle of the network device, the coordinates and steering angle of the reflection panel, the measurement result of the terminal device, and the measurement result of the network device.

3. The method according to claim 1, wherein the sending, by the location management network element, the first indication information to the network device includes sending the first indication information in a measurement request message.

4. The method according to claim 1, wherein the sending, by the location management network element, the first indication information to the network device includes sending the first indication information that includes one or more of the coordinates and steering angle of the reflection panel, a location range of the reflection panel, a direction of the reflection panel, or a direction range of the reflection panel.

5. The method according to claim 1, wherein the measurement result of the network device includes second indication information, wherein the second indication information indicates that the receive-transmit time difference and the uplink angle-of-arrival are obtained by measuring the signal reflected by the reflection panel, wherein the measurement result is obtained through measurement based on the first indication information.

6. A positioning and calibration method, comprising:

sending, by a location management network element, first indication information to a network device, wherein the first indication information is useable by the network device to measure a signal that is sent by a terminal device and that is reflected by a reflection panel;

receiving, by the location management network element, a measurement result of the network device, wherein the measurement result includes a receive-transmit time difference and an uplink angle-of-arrival that are obtained by the network device by measuring the signal that is sent by the terminal device and that is reflected by the reflection panel, and the receive-transmit time difference and an uplink angle-of-arrival that are obtained by the network device by measuring a signal sent by the terminal device in a line-of-sight (LOS) path; and determining, by the location management network element, a location of the terminal device, based on coordinates and steering angle of the network device, coordinates and steering angle of the reflection panel, and the measurement result.

7. The method according to claim 6, further comprising:

receiving, by the location management network element, a measurement result of the terminal device, wherein the measurement result includes a receive-transmit time difference obtained by the terminal device by measuring a signal that is sent by the network device and that is reflected by the reflection panel, and the receive-transmit time difference obtained by the terminal device by measuring a signal sent by the network device on the LOS path.

8. The method according to claim 6, wherein the sending, by the location management network element, the first indication information to the network device includes sending first indication information that is carried in a measurement request message.

9. The method according to claim 6, wherein the sending, by the location management network element, the first indication information to the network device includes sending first indication information that includes one or more of the following: the coordinates and steering angle of the reflection panel, a location range of the reflection panel, a direction of the reflection panel, or a direction range of the reflection panel.

10. The method according to claim 6, wherein the receiving, by the location management network element, the measurement result of the network device includes receiving the measurement result of the network device that includes second indication information, wherein the second indication information indicates that the receive-transmit time difference and the uplink angle-of-arrival that are obtained by measuring the signal reflected by the reflection panel are the measurement result obtained through measurement based on the first indication information.

11. The method according to claim 6, further comprising: sending, by the location management network element, the steering angle of the network device and/or the steering angle of the reflection panel to the network device.

12. A positioning apparatus, comprising:

a transceiver, configured to:

send first indication information to a network device, wherein the first indication information is useable by the network device to measure a signal that is sent by a terminal device and that is reflected by a reflection panel; and receive a measurement result of the network device, wherein the measurement result includes a receive-transmit time difference and an uplink angle-of-arrival that are obtained by the network device by measuring the signal that is sent by the terminal device and that is reflected by the reflection panel; and a processor, configured to determine a location of the terminal device based on coordinates and steering angle of the network device, coordinates and steering angle of the reflection panel, and the measurement result.

13. The apparatus according to claim 12, wherein the transceiver is further configured to:

receive a measurement result of the terminal device, wherein the measurement result includes a receive-transmit time difference obtained by the terminal device by measuring a signal that is sent by the network device and that is reflected by the reflection panel; and the processor is specifically configured to:

determine the location of the terminal device based on the coordinates and steering angle of the network device, the coordinates and steering angle of the reflection panel, the measurement result of the terminal device, and the measurement result of the network device.

14. The apparatus according to claim 12, wherein the first indication information is carried in a measurement request message.

15. The apparatus according to claim 12, wherein the first indication information includes one or more of the following: the coordinates and steering angle of the reflection panel, a location range of the reflection panel, a direction of the reflection panel, or a direction range of the reflection panel.

16. The apparatus according to claim 12, wherein the measurement result of the network device includes second indication information, and the second indication information indicates that the receive-transmit time difference and the uplink angle-of-arrival that are obtained by measuring the signal reflected by the reflection panel are the measurement result obtained through measurement based on the first indication information.

* * * * *